US012273799B2

(12) United States Patent
Martin et al.

(10) Patent No.: US 12,273,799 B2
(45) Date of Patent: Apr. 8, 2025

(54) LOW ACUITY DISPATCH MANAGEMENT

(71) Applicant: RapidSOS, Inc., New York, NY (US)

(72) Inventors: Michael John Martin, Long Island, NY (US); Eugene Hsu, Burlingame, CA (US)

(73) Assignee: RapidSOS, Inc., New York, NY (US)

( * ) Notice: Subject to any disclaimer, the term of this patent is extended or adjusted under 35 U.S.C. 154(b) by 379 days.

(21) Appl. No.: 17/733,520

(22) Filed: Apr. 29, 2022

(65) Prior Publication Data

US 2022/0353662 A1  Nov. 3, 2022

Related U.S. Application Data

(60) Provisional application No. 63/182,635, filed on Apr. 30, 2021.

(51) Int. Cl.
*H04W 4/90* (2018.01)
*H04M 3/51* (2006.01)

(52) U.S. Cl.
CPC ........... *H04W 4/90* (2018.02); *H04M 3/5116* (2013.01)

(58) Field of Classification Search
CPC .............................. H04W 4/90; H04M 3/5116
USPC ...................................................... 455/404.1
See application file for complete search history.

(56) References Cited

U.S. PATENT DOCUMENTS

| | | | |
|---|---|---|---|
| 10,750,346 B1 * | 8/2020 | Di Domenico | G06F 3/0481 |
| 2005/0102173 A1 * | 5/2005 | Barker | G06Q 50/18 |
| | | | 705/317 |
| 2008/0060071 A1 * | 3/2008 | Hennan | H04L 63/1416 |
| | | | 726/22 |
| 2022/0086278 A1 * | 3/2022 | Chiu | H04M 3/42068 |
| 2022/0346185 A1 * | 10/2022 | Clawson | H04W 76/50 |

\* cited by examiner

*Primary Examiner* — Maria El-Zoobi
(74) *Attorney, Agent, or Firm* — Fitch, Even, Tabin & Flannery LLP

(57) ABSTRACT

Described herein are systems, devices, methods, and media for facilitating communications between emergency service providers and low acuity emergency service providers and managing low acuity responses to emergencies.

19 Claims, 16 Drawing Sheets

CAD

Dispatcher Event Information                    Map View

● Create   ○ Update

Type:                Message From User
Subtype:             Uber App

Vehicle: Black Toyota Camry (MXJ-515)
Pickup Location: 25 W 57th St, New York, NY 10019
Dropoff Location: 225 5th Avenue, New York, NY 10010

Name:    Mauricio Gonzalez
Address: 25 W 57th St, New York, NY 10019
Phone:   (929) 412-6767

→ 871  Low Acuity Triage

Accept Event
Call Back

Add:  16:53:21
Disp: 16:54:09
Enr:  --:--:--
Arrv: --:--:--

City Wide Events

| Time | Type | Subtype | Location |
|------|------|---------|----------|
| 16:55:46 | HS | BURG | 56 Columbus Avenue... |
| 16:53:21 | MSG | UBER | 25 W 57th St, New York... |
| 16:40:55 | CALL | MBL | 3 Park Ave S, New York... |
| 16:40:55 | MSG | SN | 245 W 52nd St, New... |
| 16:39:15 | MSG | TXT | 1350 6th Avenue, New... |

City Wide Units

| Unit | Status | Time | Location |
|------|--------|------|----------|
| 915 | ER | 0:07 | Location 1 |
| 237 | AV | 1:25 | -- |
| 345 | AM | 0:25 | -- |
| 877 | OS | 2:45 | Location 2 |
| 272 | AR | 0:14 | Location 3 |

LOW ACUITY DISPATCH MANAGEMENT

CROSS-REFERENCE

This application claims the benefit of U.S. Provisional Application No. 63/182,635, filed Apr. 30, 2021, which application is incorporated herein by reference.

BACKGROUND OF THE INVENTION

A person in an emergency situation may request help using a mobile communication device such as a cell phone to dial a designated emergency number like 9-1-1 or a direct access phone number for the local emergency service provider (e.g., an emergency dispatch center). Traditionally, this call is assigned to one or more first responders by the emergency service provider, and the caller's estimated location (generally either the location of a nearby cell tower or a triangulation from the location of three or more nearby cell towers) is provided to the emergency service provider by the caller's wireless carrier (e.g., AT&T). Alternatively, the caller may provide their location to the emergency service provider by verbally speaking their location over the phone. Unfortunately, many emergency callers are unaware of their precise location or otherwise unable to verbalize it.

However, modern technologies have enabled the development and implementation of previously unimaginable or unachievable emergency services. For example, modern communication devices are capable of generating highly accurate, real-time locations (e.g., device-based hybrid locations) during emergency situations (e.g., in response to an emergency number being dialed) and transmitting the locations to emergency management systems and emergency service providers. Emergency service providers can then use these accurate locations to more quickly locate and dispatch emergency assistance to emergency callers. In another example, devices such as surveillance cameras can capture images, videos, or audio that can be shared in real-time with emergency management systems and emergency service providers to provide emergency service providers with situational awareness that they did not have access to in the past.

SUMMARY OF THE INVENTION

Current systems for emergency dispatch are constrained in the response options available for addressing a potential emergency. For example, in the case of relatively lower risk situations such as a non-emergency medical situation, dispatchers can either dispatch an ambulance or terminate the call. Accordingly, one advantage provided by the systems, servers, devices, methods, and media of the instant application is functionally linking emergency and non-emergency response systems such that they have the ability to efficiently escalate and/or deescalate the response to a potential emergency situation. For example, an emergency response data platform (ERDP) can be in operative communication with one or more emergency service providers (ESPs) and one or more low acuity providers (LAPs), for example, via the response applications installed on call taker workstations, services, and/or network devices. An initial emergency communication may be de-escalated from the ESP to an appropriate LAP, and the corresponding emergency data gathered for the incident can be shared with the LAP. In some instances, a mechanism is provided for both the de-escalation and re-escalation of an incident. The response applications utilized at the ESP and LAP, respectively, can provide streamlined interfaces facilitating the efficient transfer of the incident and associated data to the appropriate responder.

Another advantage provided by the systems, servers, devices, methods, and media of the instant application is the ability to gather and deliver device-based hybrid locations (hereinafter, "enhanced locations") and additional data that may be pertinent to emergency situations to emergency service providers (ESPs; e.g., public safety answering points, fire departments, police departments, paramedics, police officers, etc.). In some embodiments, an emergency response data platform (ERDP) includes a clearinghouse (also referred to as an "Emergency Clearinghouse") that functions to receive enhanced locations (e.g., device-based hybrid location, verified location) and additional data (e.g., medical history, video feeds, sensor data) from various sources (e.g., medical databases, mobile devices of public or first responders, public cameras, police systems, media outlets) and at various times before, during, or after emergency situations and distribute enhanced locations and additional data to ESPs to aid emergency responders in responding to live emergency situations. In some embodiments, the enhanced locations and additional data are delivered by the ERDP to a public safety answering point (PSAP). In some embodiments, the enhanced locations and additional data are displayed within a preexisting pathway, such as an Automatic Location Identification (ALI) display. In some embodiments, the enhanced locations and additional data are obtained through alternative pathways directly from the devices in the emergency. In some embodiments, relevant emergency data from different sources are consolidated and displayed for rapid and efficient response. In some embodiments, the enhanced locations and additional data are displayed through a graphical user interface provided by an emergency response application separate from the preexisting ESP system (e.g., PSAP system).

Another advantage provided by the systems, servers, devices, methods, and media of the instant application is an emergency response data platform (ERDP) that facilitates the transfer of digital information between concerned parties during, before, and after emergency situations in order to aid emergency service providers (ESPs; such as public safety answering points (PSAPs)) in providing more effective and efficient emergency response to people in need. In various embodiments described herein, the ERDP provides connectivity between ESPs and low acuity emergency service providers (also referred to as "low acuity providers" or "LAPs") such that the LAPs may be leveraged by the ESPs for low acuity emergencies, such as medical emergencies that may not require an ambulance dispatch or personal emergencies that may not require a police dispatch. Similarly, in various embodiments described herein, the ERDP provides connectivity between ESPs and LAPs such that the ESPs may be leveraged by the LAPs for escalating responses to emergency incidents. In some embodiments, the ERDP provides an emergency response application that an ESP can use to access LAPs. In some embodiments, the ERDP provides a low acuity response application that an LAP can use to communicate with ESPs.

In some aspects, disclosed herein is a computer-implemented method for providing emergency response assistance, the method comprising: receiving a request to initiate a low acuity response to an emergency incident from an emergency service provider (ESP); transmitting emergency data associated with the emergency incident to a low acuity provider (LAP); and facilitating an emergency communication session between the LAP and a communication device associated with the emergency incident. In some embodiments, facilitating the emergency communication session between the LAP and the communication device associated with the emergency incident comprises transmitting a weblink to the communication device associated with the emergency incident, wherein the weblink points to an audio or video call hosted with the LAP. In some embodiments, facilitating the emergency communication session between the LAP and the communication device associated with the emergency incident comprises: establishing a communication bridge for the emergency communication session; connecting a voice call between the communication device associated with the emergency incident and the ESP to the communication bridge; and connecting the LAP to the communication bridge. In some embodiments, the request to initiate the low acuity response is generated by an ESP application accessed by the ESP. In some embodiments, the ESP application is a CPE system. In some embodiments, the ESP application is a CAD system. In some embodiments, the request to initiate the low acuity response is generated by an emergency response application comprising a graphical user interface (GUI) and wherein the GUI comprises one or more selectable low acuity triage options associated with one or more LAPs. In some embodiments, one of the one or more LAPs is a telemedicine provider. In some embodiments, the GUI of the emergency response application comprises a plurality of selectable low acuity triage options associated with a plurality of LAPs. In some embodiments, the method further comprises providing the emergency response application to the ESP, wherein the emergency response application is a website or a web application accessible via a standard web browser. In some embodiments, the method further comprises providing a low acuity response application to the LAP and wherein the emergency data associated with the emergency incident is displayed within a GUI of the low acuity response application. In some embodiments, the emergency communication session between the LAP and the communication device associated with the emergency incident is facilitated through the low acuity response application. In some embodiments, the method further comprises receiving a request to escalate the emergency incident from the LAP and notifying the ESP of the request to escalate the emergency incident. In some embodiments, the method comprises providing an API comprising a graphical user interface (GUI) allowing the LAP to escalate the emergency incident back to the ESP. In some embodiments, the GUI comprises one or more selectable options associated with the ESP. In some embodiments, the method further comprises sending updated emergency data associated with the emergency incident to the ESP after receiving the request to escalate the emergency incident from the LAP.

In some aspects, disclosed herein is a system for providing emergency response assistance, the system comprising a processor configured to: receive a request to initiate a low acuity response to an emergency incident from an emergency service provider (ESP); transmit emergency data associated with the emergency incident to a low acuity provider (LAP); and facilitate an emergency communication session between the LAP and a communication device associated with the emergency incident.

In some aspects, disclosed herein is a method for providing emergency response assistance, the method comprising: providing an emergency response application to an emergency service provider (ESP), wherein the emergency response application comprises a graphical user interface (GUI) comprising a list of emergency incidents; receiving selection of an emergency incident from the list of emergency incidents; presenting one or more selectable low acuity triage options associated with one or more low acuity providers (LAPs) within the GUI of the emergency response application; receiving selection of one of the low acuity triage options associated with an LAP; and transmitting emergency data associated with the emergency incident to the LAP. In some embodiments, the GUI of the emergency response application comprises a plurality of selectable low acuity triage options associated with a plurality of LAPs. In some embodiments, the one or more LAPs includes a telemedicine provider. In some embodiments, the method further comprises transmitting a weblink to a communication device associated with the emergency incident, wherein the weblink points to an audio or video call hosted with the telemedicine provider. In some embodiments, the method further comprises providing a low acuity response application to the LAP and facilitating an emergency communication session between the communication device associated with the emergency incident and the LAP through the emergency response application. In some embodiments, the method further comprises displaying the emergency data associated with the emergency incident within a GUI of the emergency response application. In some embodiments, the emergency response application is a website or a web application accessible via a standard web browser. In some embodiments, the emergency response application is a website or a web application accessible via a standard web browser. In some embodiments, the method further comprises determining, based at least in part on the emergency data associated with the emergency incident, that the emergency incident represents a possible low acuity medical emergency and presenting the one or more selectable low acuity triage options within the GUI of the emergency response application in response to determining that the emergency incident represents a possible low acuity medical emergency. In some embodiments, the method further comprises receiving a request to escalate the emergency incident from the LAP and notifying the ESP of the request to escalate the emergency incident. In some embodiments, the low acuity response does not include dispatching an ambulance or a police unit. In some aspects, disclosed herein is a system for providing emergency response assistance, the system comprising a processor configured to: provide an emergency response application to an emergency service provider (ESP), wherein the emergency response application comprises a graphical user interface (GUI) comprising a list of emergency incidents; receive selection of an emergency incident from the list of emergency incidents; present one or more selectable low acuity triage options associated with one or more low acuity providers (LAPs) within the GUI of the emergency response application; receive selection of one of the low acuity triage options associated with an LAP; and transmit emergency data associated with the emergency incident to the LAP.

In some aspects, disclosed herein is a system for providing emergency response assistance, the system comprising: a network component operatively in communication with a plurality of emergency service provider (ESP) network devices and a plurality of low acuity dispatch provider (LAP) network devices; and a processor, operatively coupled to the network component, the processor configured to: receive a request to initiate a low acuity response to an emergency incident from an ESP network device selected from the plurality of ESP network devices; determine an LAP network device for providing the low acuity response from the plurality of LAP network devices; provide the emergency data associated with the emergency incident to the low acuity provider (LAP) network device; and facilitate an emergency communication session between the LAP and a communication device associated with the emergency incident. In some embodiments, facilitating the emergency communication session between the LAP and the communication device associated with the emergency incident comprises transmitting a weblink to the communication device associated with the emergency incident, wherein the weblink points to an audio or video call hosted with the LAP. In some embodiments, facilitating the emergency communication session between the LAP and the communication device associated with the emergency incident comprises: establishing a communication bridge for the emergency communication session; connecting a voice call between the communication device associated with the emergency incident and the ESP to the communication bridge; and connecting the LAP to the communication bridge. In some embodiments, the request to initiate the low acuity response is generated by an ESP application accessed by the ESP. In some embodiments, the ESP application is a CPE system. In some embodiments, the ESP application is a CAD system. In some embodiments, the request to initiate the low acuity response is generated by an emergency response application comprising a graphical user interface (GUI) and wherein the GUI comprises one or more selectable low acuity triage options associated with one or more LAPs. In some embodiments, one of the one or more LAPs is a telemedicine provider. In some embodiments, the GUI of the emergency response application comprises a plurality of selectable low acuity triage options associated with a plurality of LAPs. In some embodiments, the processor is configured to provide the emergency response application to the ESP, wherein the emergency response application is a website or a web application accessible via a standard web browser. In some embodiments, the processor is configured to provide a low acuity response application to the LAP and wherein the emergency data associated with the emergency incident is displayed within a GUI of the low acuity response application. In some embodiments, the emergency communication session between the LAP and the communication device associated with the emergency incident is facilitated through the low acuity response application. In some embodiments, the processor is configured to receive a request to escalate the emergency incident from the LAP and notifying the ESP of the request to escalate the emergency incident. In some embodiments, the processor is configured to provide an API comprising a graphical user interface (GUI) allowing the LAP to escalate the emergency incident back to the ESP. In some embodiments, the GUI comprises one or more selectable options associated with the ESP. In some embodiments, the processor is configured to send updated emergency data associated with the emergency incident to the ESP after receiving the request to escalate the emergency incident from the LAP.

In some aspects, disclosed herein is a system for providing emergency response assistance, the system comprising: an emergency service provider (ESP) network device configured to: provide a graphical user interface comprising an interactive element for receiving user instructions to send a request to initiate a low acuity response to an emergency incident; send the request to initiate the low acuity response to the emergency incident to an emergency data server in response to selection of the interactive element; an emergency data server operatively in communication with a plurality of ESP network devices comprising the ESP network device and a plurality of low acuity dispatch provider (LAP) network devices, the emergency data server configured to: receive the request to initiate the low acuity response to an emergency incident from the ESP network device; determine an LAP network device for providing the low acuity response from the plurality of LAP network devices; provide emergency data associated with the emergency incident to the low acuity provider (LAP) network device; and facilitate an emergency communication session between the LAP network device and a communication device associated with the emergency incident. In some embodiments, facilitating the emergency communication session between the LAP and the communication device associated with the emergency incident comprises transmitting a weblink to the communication device associated with the emergency incident, wherein the weblink points to an audio or video call hosted with the LAP. In some embodiments, facilitating the emergency communication session between the LAP and the communication device associated with the emergency incident comprises: establishing a communication bridge for the emergency communication session; connecting a voice call between the communication device associated with the emergency incident and the ESP to the communication bridge; and connecting the LAP to the communication bridge. In some embodiments, the request to initiate the low acuity response is generated by an ESP application accessed by the ESP. In some embodiments, the ESP application is a CPE system. In some embodiments, the ESP application is a CAD system. In some embodiments, the request to initiate the low acuity response is generated by an emergency response application comprising a graphical user interface (GUI) and wherein the GUI comprises one or more selectable low acuity triage options associated with one or more LAPs. In some embodiments, one of the one or more LAPs is a telemedicine provider. In some embodiments, the GUI of the emergency response application comprises a plurality of selectable low acuity triage options associated with a plurality of LAPs. In some embodiments, the emergency response server is configured to provide the emergency response application to the ESP, wherein the emergency response application is a website or a web application accessible via a standard web browser. In some embodiments, the emergency response server is configured to provide a low acuity response application to the LAP and wherein the emergency data associated with the emergency incident is displayed within a GUI of the low acuity response application. In some embodiments, the emergency communication session between the LAP and the communication device associated with the emergency incident is facilitated through the low acuity response application. In some embodiments, the emergency response server is configured to receive a request to escalate the emergency incident from the LAP and notifying the ESP of the request to escalate the emergency incident. In some embodiments, the emergency response server is configured to provide an API comprising a graphical user interface (GUI) allowing the LAP to escalate the emergency incident back to the ESP. In some embodiments, the GUI comprises one or more selectable options associated with the ESP. In some embodiments, the emergency response server is configured to send updated emergency data associated with the emergency incident to the ESP after receiving the request to escalate the emergency incident from the LAP.

In some aspects, disclosed herein is a method for providing assistance to a low acuity provider by an emergency response data platform (ERDP), the method comprising: (a) receiving an escalation request comprising an emergency location from a low acuity provider (LAP); (b) determining, based on the emergency location, an emergency service provider appropriate to respond to the escalation request; (c) establishing a first voice connection with the LAP and a second voice connection with the ESP; and (d) bridging the first and second voice connections to facilitate an emergency communication session between the LAP and the ESP. In some embodiments, the escalation request is a text message. In some embodiments, further comprising provisioning an ERDP phone number to receive the text message. In some embodiments, the emergency location is a street address. In some embodiments, the first and second voice connections are voice calls. In some embodiments, the first and second voice calls are telephone calls. In some embodiments, the first and second voice calls are voice over internet protocol (VoIP) calls. In some embodiments, further comprising: (a) in response to receiving the escalation request, transmitting an emergency confirmation request to the LAP; and (b) receiving confirmation of the escalation request from the LAP. In some embodiments, the emergency confirmation request is a text message. In some embodiments, the emergency confirmation request comprises a link to a map displaying the emergency location. In some embodiments, further comprising transmitting the emergency location to the ESP for display within the graphical user interface (GUI) of an emergency response application executed on a computing device associated with the ESP. In some embodiments, the emergency response application is a computer aided dispatch (CAD) system. In some embodiments, further comprising providing the emergency response application to the ESP. In some embodiments, the emergency response application is a website or a web application accessible via a standard web browser. In some embodiments, the escalation request is received from the LAP through a low acuity response application executed on a computing device associated with the LAP. In some embodiments, the first voice connection is established with the LAP through the low acuity response application. In some embodiments, further comprising providing the low acuity response application to the LAP.

In some aspects, disclosed herein is a system for providing assistance to a low acuity provider by an emergency response data platform (ERDP), the system comprising a processor configured to: (a) receive an escalation request comprising an emergency location from a low acuity provider (LAP); (b) determine, based on the emergency location, an emergency service provider appropriate to respond to the escalation request; (c) establish a first voice connection with the LAP and a second voice connection with the ESP; and (d) bridge the first and second voice connections to facilitate an emergency communication session between the LAP and the ESP. In some embodiments, the escalation request is a text message. In some embodiments, further comprising provisioning an ERDP phone number to receive the text message. In some embodiments, the emergency location is a street address. In some embodiments, the first and second voice connections are voice calls. In some embodiments, the first and second voice calls are telephone calls. In some embodiments, the first and second voice calls are voice over internet protocol (VoIP) calls. In some embodiments, further comprising: (a) in response to receiving the escalation request, transmitting an emergency confirmation request to the LAP; and (b) receiving confirmation of the escalation request from the LAP. In some embodiments, the emergency confirmation request is a text message. In some embodiments, the emergency confirmation request comprises a link to a map displaying the emergency location. In some embodiments, further comprising transmitting the emergency location to the ESP for display within the graphical user interface (GUI) of an emergency response application executed on a computing device associated with the ESP. In some embodiments, the emergency response application is a computer aided dispatch (CAD) system. In some embodiments, further comprising providing the emergency response application to the ESP. In some embodiments, the emergency response application is a website or a web application accessible via a standard web browser. In some embodiments, the escalation request is received from the LAP through a low acuity response application executed on a computing device associated with the LAP. In some embodiments, the first voice connection is established with the LAP through the low acuity response application. In some embodiments, further comprising providing the low acuity response application to the LAP.

In some aspects, disclosed herein is a method for providing assistance to an emergency service provider by an emergency response data platform (ERDP), the method comprising: (a) establishing a communication link with an emergency service provider (ESP) through an emergency response application executed on a computing device associated with the ESP, wherein the emergency response application comprises a graphical user interface (GUI) comprising a list of one or more emergency incidents; (b) receiving, through the emergency response application, a secondary triage notification indicating that the ESP would like to initiate a low acuity response to an emergency incident selected from the list of one or more emergency incidents; and (c) transmitting emergency data associated with the emergency incident to a low acuity provider (LAP) for display within a low acuity response application accessed by a computing device associated with the LAP. In some embodiments, the secondary triage notification comprises an initial determination that the emergency incident represents an emergency that is non-emergent and does not require dispatching an ambulance or police unit. In some embodiments, further comprising, in response to receiving the secondary triage notification, removing the emergency incident from the list of one or more emergency incidents. In some embodiments, further comprising receiving, through the low acuity response application, a request to escalate the emergency incident. In some embodiments, further comprising, in response to receiving the request to escalate the emergency incident, replacing the removed emergency incident within the list of one or more emergency incidents or generating a new emergency incident within the list of one or more emergency incidents to replace the removed emergency incident. In some embodiments, the selection of the emergency incident from the list of one or more emergency incidents prompts the emergency response application to display a plurality of low acuity triage options within the GUI of the emergency response application and wherein the request to initiate a low acuity response to the emergency incident is generated by the emergency response application in response to a selection of one of the plurality of low acuity triage options. In some embodiments, the plurality of low acuity triage options is associated with a respective plurality of LAPs. In some embodiments, the plurality of low acuity triage options comprises two or more of nurse triage response, telemedicine response, crisis management response, and self-transport response. In some embodiments, the emergency response application is not provided to the ESP by the ERDP. In some embodiments, the emergency response application is a customer premises equipment (CPE), call handling equipment (CHE), or computer aided dispatch (CAD) system. In some embodiments, the low acuity response application is not provided to the LAP by the ERDP. In some embodiments, the low acuity response application is a website or a web application accessible via a standard web browser and provided to the LAP by the ERDP. In some embodiments, further comprising facilitating an emergency communication session between the LAP and a communication device associated with the emergency incident. In some embodiments, the emergency communication session between the LAP and the communication device associated with the emergency incident is facilitated through the low acuity response application. In some embodiments, the LAP is a telemedicine provider. In some embodiments, the emergency communication session is an audio or voice call. In some embodiments, facilitating the emergency communication session between the LAP and the communication device associated with the emergency incident comprises transmitting a weblink to the communication device associated with the emergency incident and wherein the weblink points to the audio or video call. In some embodiments, facilitating the emergency communication session between the LAP and the communication device associated with the emergency incident comprises: (a) establishing a communication bridge for the emergency communication session; (b) connecting a voice call between the communication bridge associated with the emergency incident and the ESP to the communication bridge; and (c) connecting the LAP to the communication bridge.

In some aspects, disclosed herein is a system for providing assistance to an emergency service provider (ESP), the system comprising a network component operatively in communication with a plurality of emergency service providers (ESPs) and a plurality of low acuity providers (LAPs) and a processor, operatively coupled to the network component, the processor configured to: (a) establish a communication link with an emergency service provider (ESP) through an emergency response application executed on a computing device associated with the ESP, wherein the emergency response application comprises a graphical user interface (GUI) comprising a list of one or more emergency incidents; (b) receive, through the emergency response application, a secondary triage notification indicating that the ESP would like to initiate a low acuity response to an emergency incident selected from the list of one or more emergency incidents; and (c) transmit emergency data associated with the emergency incident to a low acuity provider (LAP) for display within a low acuity response application accessed by a computing device associated with the LAP. In some embodiments, the secondary triage notification comprises an initial determination that the emergency incident represents an emergency that is non-emergent and does not require dispatching an ambulance or police unit. In some embodiments, further comprising, in response to receiving the secondary triage notification, removing the emergency incident from the list of one or more emergency incidents. In some embodiments, further comprising receiving, through the low acuity response application, a request to escalate the emergency incident. In some embodiments, further comprising, in response to receiving the request to escalate the emergency incident, replacing the removed emergency incident within the list of one or more emergency incidents or generating a new emergency incident within the list of one or more emergency incidents to replace the removed emergency incident. In some embodiments, the selection of the emergency incident from the list of one or more emergency incidents prompts the emergency response application to display a plurality of low acuity triage options within the GUI of the emergency response application and wherein the request to initiate a low acuity response to the emergency incident is generated by the emergency response application in response to a selection of one of the plurality of low acuity triage options. In some embodiments, the plurality of low acuity triage options is associated with a respective plurality of LAPs. In some embodiments, the plurality of low acuity triage options comprises two or more of nurse triage response, telemedicine response, crisis management response, and self-transport response. In some embodiments, the emergency response application is not provided to the ESP by the ERDP. In some embodiments, the emergency response application is a customer premises equipment (CPE), call handling equipment (CHE), or computer aided dispatch (CAD) system. In some embodiments, the low acuity response application is not provided to the LAP by the ERDP. In some embodiments, the low acuity response application is a website or a web application accessible via a standard web browser and provided to the LAP by the ERDP. In some embodiments, further comprising facilitating an emergency communication session between the LAP and a communication device associated with the emergency incident. In some embodiments, the emergency communication session between the LAP and the communication device associated with the emergency incident is facilitated through the low acuity response application. In some embodiments, the LAP is a telemedicine provider. In some embodiments, the emergency communication session is an audio or voice call. In some embodiments, facilitating the emergency communication session between the LAP and the communication device associated with the emergency incident comprises transmitting a weblink to the communication device associated with the emergency incident and wherein the weblink points to the audio or video call. In some embodiments, facilitating the emergency communication session between the LAP and the communication device associated with the emergency incident comprises: (a) establishing a communication bridge for the emergency communication session; (b) connecting a voice call between the communication bridge associated with the emergency incident and the ESP to the communication bridge; and (c) connecting the LAP to the communication bridge.

In some aspects, disclosed herein is a system for providing assistance to an emergency service provider, the system comprising: (a) an emergency service provider (ESP), communicatively coupled to an emergency response data platform (ERDP), configured to: (i) execute, on a computing device associated with the ESP, an emergency response application comprising a GUI comprising a list of one or more emergency incidents; and (ii) transmit, through the emergency response application, a secondary triage notification indicating that the ESP would like to initiate a low acuity response to an emergency incident selected from the list of one or more emergency incidents, wherein the request to initiate a low acuity response comprises an initial determination that the emergency incident represents an emergency that is non-emergent and does not require dispatching an ambulance or police unit; (b) the ERDP, configured to: (i) receive, from the ESP, the secondary triage notification; and (ii) transmit emergency data associated with the emergency incident to a low acuity provider (LAP); and (c) the LAP, configured to: (i) execute a low acuity response application on a computing device associated with the LAP; and (ii) receive, from the ERDP, the emergency data associated with the emergency incident for display within a GUI of the low acuity response application.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 8 illustrates an example of a GUI of a computer aided dispatch (CAD) system in accordance with one embodiment of the present disclosure;

FIG. 13 illustrates an example of a GUI of a low acuity response application in accordance with one embodiment of the present disclosure.

DETAILED DESCRIPTION

Disclosed herein are systems, devices, media, and methods for providing enhanced emergency communications and functions. Embodiments of the present disclosure take advantage of technological advancements that have allowed for mobile communication devices to generate accurate locations by incorporating multiple technologies embedded in the devices, such as GPS, Wi-Fi, and Bluetooth to create device-based hybrid locations. Device-based hybrid locations are locations calculated on an electronic or communication device, as opposed to locations calculated using a network (e.g., a carrier network). Device-based hybrid locations can be generated using GPS, network-based technologies, Wi-Fi access points, Bluetooth beacons, barometric pressure sensors, dead reckoning using accelerometers and gyrometers, and a variety of crowdsourced and proprietary databases that device operating systems providers are running to enhance location technology. These device-based hybrid locations can be quickly generated during emergency calls.

Furthermore, electronic communication devices (e.g., mobile phones, wearables, IoT devices, smart home devices, vehicle computers, etc.) are now often capable of generating or storing additional information that provide situational awareness about emergencies, such as health data or medical histories. For example, during an emergency, a modern electronic communication device may have access to an implicated person's blood type, preexisting medical conditions, or even the implicated person's current heartrate. In some embodiments, the electronic communication device has access to data from sensors (e.g., health or environmental sensors). For example, a video feed of the emergency via a connected surveillance camera can provide valuable situational awareness regarding the emergency.

Emergency Response Data Platform

Figure 1:
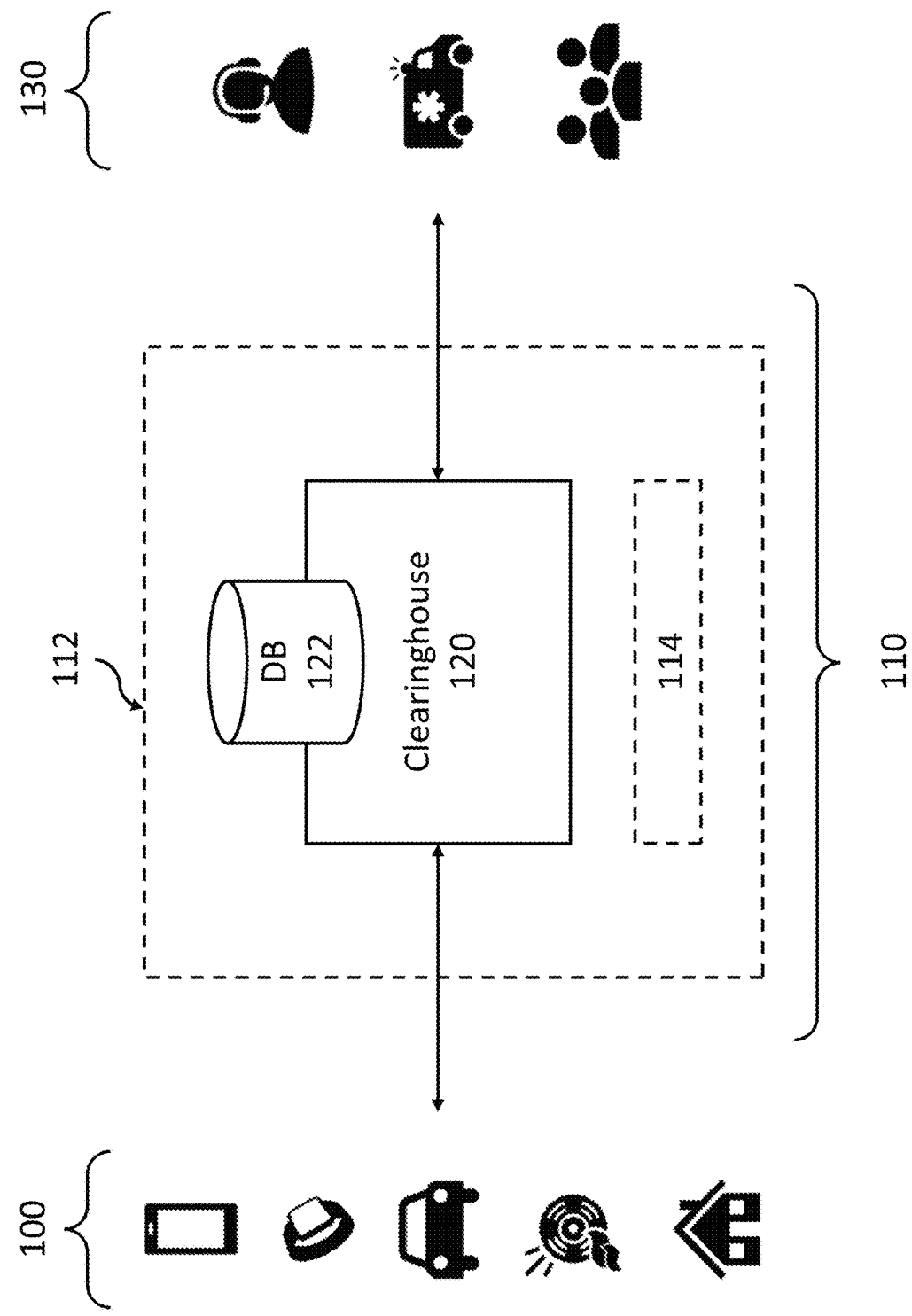
FIG. 1 depicts a diagram of an emergency response data platform in accordance with one embodiment of the present disclosure.

In various embodiments, disclosed herein are devices, systems, and methods for managing emergency data and emergency communications for more effective and efficient emergency response. FIG. 1 depicts a diagram of an emergency response data platform in accordance with one embodiment of the present disclosure. In a simple example, in some embodiments, an emergency data source 100 (also referred to as an "ingress data source") transmits emergency to an emergency response data platform (ERDP) 110 before, during, or after an emergency, and the emergency response data platform 110 shares the emergency data with an emergency data recipient 130 (also referred to as an "egress data recipient"). Examples of ingress data sources include mobile phones, wearable devices, vehicle telematics systems, smart security systems, and mobile applications. Examples of egress data recipients include public safety answering points, first responders, and emergency contacts. After receiving emergency data from the ERDP 110, the emergency data recipient 130 can then use the emergency data to more efficiently and effectively respond to corresponding emergencies. In some embodiments, the emergency data source 100 is a third-party server system (hereinafter, "third-party server"). For example, in some embodiments, the emergency data source 100 is a third-party server (e.g., a backend server system) of a technology company that produces software for electronic devices, such as Apple or Google. In some embodiments, the emergency data source 100 is an electronic device. For example, the emergency data source 100 may be a communication device (e.g., a walkie talkie or two-way radio, a mobile or cellular phone, a computer, a laptop, etc.), a wearable device (e.g., a smartwatch), or an Internet of Things (IoT) device such as a home assistant (e.g., an Amazon Echo) or a connected smoke detector (e.g., a Nest Protect smoke and carbon monoxide alarm). In some embodiments, an electronic device includes a display, a processor, a memory (e.g., an EPROM memory, a RAM, or a solid-state memory), a network component (e.g., an antenna and associated components, Wi-Fi adapters, Bluetooth adapters, etc.), a data storage, a user interface, an emergency alert program, one or more location components, and one or more sensors. In some embodiments, the processor is implemented as one or more microprocessors, microcomputers, microcontrollers, digital signal processors, central processing units, state machines, logic circuitries, and/or devices that manipulate signals based on operational instructions. Among other capabilities, the processor is configured to fetch and execute computer-readable instructions stored in the memory.

In some embodiments, the display is part of the user interface (e.g., a touchscreen is both a display and a user interface in that it provides an interface to receive user input or user interactions). In some embodiments, the user interface includes physical buttons such as an on/off button or volume buttons. In some embodiments, the display and/or the user interface comprises a touchscreen (e.g., a capacitive touchscreen), which is capable of displaying information and receiving user input. In some embodiments, the communication device includes various accessories that allow for additional functionality. In some embodiments, these accessories (not shown) include one or more of the following: a microphone, a camera, speaker, a fingerprint scanner, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, or a hematology analyzer. In some embodiments, the data storage includes a location data cache and a user data cache. In some embodiments, the location data cache is configured to store locations generated by the one or more location components.

In some embodiments, electronic communication devices include various devices with communication capability to communicate with other devices via Wi-fi, Bluetooth, etc. Many of these devices are Internet-enabled and can communicate via the Internet by sending messages such as chat, email, HTTP post, etc. Some electronic communication devices have phone numbers and are enabled for cellular communication or VoIP, such as a SIM-enabled wearable device. Other devices may not have a phone number and be unable to make wireless calls or send SMS. In some cases, devices that do not have a phone number may be associated with the owner's account phone number or be assigned a number for the duration of the emergency session. Communication devices may include various devices such as computers, mobile phones, wearables, digital assistants, smart TVs, security systems, vehicular telematics systems, IoT sensors, etc.

In some embodiments, the emergency alert program is a web application or mobile application. In some embodiments, the emergency alert program is configured to record user data, such as a name, address, or medical data of a user associated with the electronic device. In some embodiments, the emergency alert program is configured to detect when an emergency request is generated or sent by the electronic device (e.g., when a user uses the electronic device to make an emergency call). In some embodiments, in response to detecting an emergency request generated or sent by the electronic device, the emergency alert program is configured to deliver a notification to the ERDP 110. In some embodiments, the notification is an HTTP post containing information regarding the emergency request. In some embodiments, the notification includes a location (e.g., a device-based hybrid location) generated by or for the electronic device. In some embodiments, in response to detecting an emergency request generated or sent by the electronic device, the emergency alert program is configured to deliver user data to the ERDP 110.

In some embodiments, the emergency response data platform (ERDP) 110 includes an ERDP operating system, an ERDP CPU, an ERDP memory unit, an EMS communication element, and one or more software modules. In some embodiments, the ERDP CPU is implemented as one or more microprocessors, microcomputers, microcontrollers, digital signal processors, central processing units, state machines, logic circuitries, and/or devices that manipulate signals based on operational instructions. Among other capabilities, the ERDP CPU is configured to fetch and execute computer-readable instructions stored in the ERDP memory unit. The ERDP memory unit optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The ERDP memory unit optionally includes modules, routines, programs, objects, components, data structures, etc., which perform particular tasks or implement particular abstract data types.

In some embodiments, the ERDP 110 includes one or more ERDP databases, one or more servers, and a clearinghouse 120. In some embodiments, the clearinghouse 120, as described in further detail below, is an input/output (I/O) interface configured to manage communications and data transfers to and from the ERDP 110 and external systems and devices. In some embodiments, the clearinghouse 120 includes a variety of software and hardware interfaces, for example, a web interface, a graphical user interface (GUI), and the like. The clearinghouse 120 optionally enables the ERDP 110 to communicate with other computing devices, such as web servers and external data servers. In some embodiments, the clearinghouse 120 facilitates multiple communications within a wide variety of networks and protocol types, including wired networks, for example, LAN, cable, etc., and wireless networks, such as WLAN, cellular, or satellite. In some embodiments, the clearinghouse 120 includes one or more ports for connecting a number of devices to one another or to another server. In some embodiments, the clearinghouse 120 includes one or more sub-clearinghouses, such as location clearinghouse and additional data clearinghouse, configured to manage the transfer of locations and additional data, respectively. In some embodiments, the ERDP 110 additionally includes a user information module that receives and stores user information (e.g., personal information, demographic information, medical information, location information, etc.) within the ERDP 110. In some embodiments, users can submit user information through a website, web application, or mobile application, such as during a registration process for an emergency response application. In some embodiments, when the ERDP 110 receives emergency data including user information, such as through an emergency alert received by the clearinghouse 120 (as described below), the ERDP 110 stores the user information in the user information module. In some embodiments, user information stored within the user information module is received by the ERDP 110 from a third-party server system, as described above. In some embodiments, user information stored within the user information module is associated with an identifier of a user or an electronic device associated with a user, such as a phone number or an email address.

As mentioned above, in some embodiments, the emergency response data platform (ERDP) 110 shares emergency data with an emergency data recipient 130. In some embodiments, an emergency data recipient 130 is an emergency service provider (ESP; e.g., a public safety answering point (PSAP)), which is a system that includes one or more of a display, a user interface, at least one central processing unit or processor, a network component, an audio system, (e.g., microphone, speaker and/or a call-taking headset), and an ESP application (e.g., a computer program) such as a computer aided dispatch (CAD) program or an emergency call taking program (also referred to as customer premise equipment or CPE). In some embodiments, the ESP application comprises a database of emergency responders, such as medical assets, police assets, fire response assets, rescue assets, safety assets, etc. In some embodiments, the ESP application is an emergency response application provided by the ERDP 110, as described below. In some embodiments, the ESP application is installed on a computing device at the ESP and comprise one or more software modules, such as a call taking module, an ESP display module, a supplemental or updated information module, or a combination thereof. In some embodiments, the ESP application displays the information on a map (e.g., on the display). In some embodiments, the ESP application is accessible or executable on mobile devices associated with ESP, such as first responder devices. In some embodiments, the ESP application is an emergency response application provided by the ERDP 110, as described below.

Emergency Clearinghouse

In some embodiments, as mentioned above with respect to FIG. 1, the emergency response data platform (ERDP) 110 includes a clearinghouse 120 (also referred to as an "Emergency Clearinghouse") for receiving, storing, retrieving, and transmitting emergency data. In some embodiments, as depicted by FIG. 1, through the clearinghouse 120, the ERDP 110 can receive emergency data from an emergency data source 100 (as described above) and transmit the emergency data to an emergency data recipient 130, such as an emergency service provider (ESP) (as described above). In this way, the ERDP 110 acts as a data pipeline between emergency data sources 100 and ESPs. The emergency data that passes through the clearinghouse 120 may include (but is not limited to) location data (e.g., fixed addresses or device-based hybrid locations generated in real time) and additional data (e.g., medical history, personal information, or contact information, etc.). In some embodiments, through the clearinghouse 120, the ERDP 110 transmits emergency data to ESPs to aid the ESPs in responding to emergencies. For example, location data may allow emergency responders to arrive at the scene of an emergency faster, and additional data may allow emergency responders to be better prepared for the emergencies that they face. In some embodiments, location data is generated by an emergency data source 100 and can be made accessible by the ERDP 110 to an emergency data recipient 130 (e.g., an ESP) before a request for emergency service (e.g., an emergency call) is made from or by the emergency data source 100 or even without a request for emergency service being made from or by the emergency data source 100. For example, a taxi company may have software that transmits the location of its cars or assets to the emergency clearinghouse 120 preemptively. Thus, when a request for emergency service regarding a particular taxi is made, the location of the affected taxi can be made accessible quicker to send help. In addition, the ERDP 110 may transmit emergency data received from an emergency data source 100 to an emergency data recipient 130 even when or if a request for emergency service (e.g., an emergency call) made from or by the emergency data source 100 does not reach the emergency data recipient 130 or gets disconnected.

The clearinghouse 120 may receive emergency data in various ways. For example, in some embodiments, an emergency data source 100 can unilaterally transmit emergency data to the clearinghouse 120. For example, in one embodiment, an emergency alert is triggered by an electronic device manually (e.g., in response to the selection of a soft or hard emergency button) or automatically based on sensor data received by the electronic device (e.g., smoke alarms). The electronic device can then transmit the emergency alert and any associated data to the ERDP 110, such as to an endpoint provided by the clearinghouse 120. Or, for example, in one embodiment, after an emergency alert is received by the ERDP 110 from a first emergency data source, the ERDP 110 can query a second emergency data source for emergency data (e.g., emergency data associated with the emergency alert received from the first emergency data source). For example, the emergency alert received from the first emergency data source may include a user identifier (e.g., a telephone number or an email address) for an owner or user of the first emergency data source. The ERDP 110 can then query the second emergency data source with the user identifier to retrieve additional emergency data associated with the owner or user of the first emergency data source. In some embodiments, emergency data received by the ERDP 110 is received in a format that is compatible with industry standards for storing and sharing emergency data. In some embodiments, the ERDP 110 formats emergency data that it receives into a format that is compatible with industry standards. For example, in some embodiments, the emergency data is formatted to be compatible with National Emergency Number Association (NENA) standards. In some embodiments, emergency data is formatted by the ERDP 110 to be compliant with the Presence Information Data Format Location Object (PIDF-LO) standard. In some embodiments, emergency data received by the ERDP 110 is stored within one or more databases 122. In some embodiments, emergency data received by the ERDP 110 is associated with one or more identifiers, such as a device or user identifier.

The clearinghouse 120 may share emergency data in various ways. For example, in some embodiments, an emergency data recipient 130, such as an ESP, can query the ERDP 110 for emergency data. For example, in some embodiments, an ESP can query the ERDP 110 with a user identifier (e.g., a telephone number or an email address) to receive emergency data gathered or received by the ERDP 110 associated with the user identifier. Or for example, in some embodiments, an ESP 130 can query the ERDP 110 with a geospatial area to receive emergency data gathered or received by the ERDP 110 associated with the geospatial area. Alternatively, in some embodiments, the ERDP 110 can autonomously transmit emergency data to an emergency data recipient without first receiving a query from the emergency data recipient (also referred to as "pushing" emergency data, as opposed to emergency data being "pulled" with a query). In some embodiments, the ERPD 110 pushes emergency data to an emergency data recipient using an emergency data subscription system. Using the emergency data subscription system, an emergency data recipient can subscribe to the clearinghouse 120 for a particular device identifier, user identifier, ESP account, or geospatial area. After subscribing to a subscription, the emergency data recipient may automatically receive updates regarding the subscription without first sending a query for emergency data. For example, if an ESP subscribes to a phone number, whenever the ERDP 110 receives updated emergency data associated with the phone number, the clearinghouse 120 can instantly and automatically transmit the updated emergency data associated with the phone number to the ESP.

As used herein, "emergency data" refers to data pertaining to an on-going or historical emergency. The emergency data may be generated at the time of the emergency. The emergency data may be generated before the emergency occurs and may be made accessible when the emergency occurs. In some embodiments, the emergency data comprises location data, particularly the current location of the emergency (often times based on the location of the user device). Because of privacy and security concerns, emergency data must be stored, accessed, transmitted using security and privacy measures. As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component).

Emergency Data Geofencing

In some embodiments, a geofence system 112 is applied to the clearinghouse 120 or the ERDP 110 to protect sensitive emergency data from being shared with unintended recipients. As depicted in FIG. 1, in some embodiments, when emergency data (e.g., an emergency location or additional data) is received by the ERDP 110 from an emergency data source 100, the emergency data is first processed by the geofence system 112 before being ingested by the clearinghouse 120. Similarly, in some embodiments, when a query for emergency data is received by the ERDP 110 from an emergency data recipient 130 (e.g., an ESP), the query is processed by the geofence system 112 before emergency data is transmitted to the emergency data recipient.

Generally, a geofence is a virtual perimeter that represents a real-world geographic area. A geofence can be dynamically generated—as in a radius around a point location—or a geofence can be a predefined set of boundaries (such as school zones or neighborhood boundaries). For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP) or a public safety service (PSS; e.g., a police department, a fire department, a federal disaster management agency, national highway police, etc.), which have jurisdiction over a designated area (sometimes, overlapping areas). Geofences are used to define the jurisdictional authority by various methods and in various Geographic Information System (GIS) formats. In some embodiments, geofences only represent authoritative regions if the geofence has been assigned or verified by a local, state, or federal government. In some embodiments, geofences represent assigned jurisdictions that are not necessarily authoritative regions. For example, in some embodiments, a geofence is unilaterally created by its associated ESP without verification or assignment by a local, state, or federal government.

In some embodiments, the ERDP 110 maintains a geofence database including one or more geofences associated with each ESP that is or has ever been communicatively coupled to the ERDP 110. In some embodiments, a geofence associated with an ESP may be submitted to the ERDP 110 by an administrator of the ESP, such as through an emergency response application (as described below) or via email. In some embodiments, when emergency data is received by the ERDP 110 the ERDP 110 identifies a location associated with the emergency data (e.g., an emergency location included in an emergency alert) and determines if the location is within the combined authoritative jurisdiction (i.e., within any one of the geofences stored in the geofence database). In some embodiments, if the location is not within the combined authoritative jurisdiction, the ERDP 110 rejects or drops the emergency data (also referred to as "ingress filtering"). In some embodiments, when the ERDP 110 receives a query for emergency data from an ESP, the ERDP 110 identifies a geofence associated with the ESP and returns only emergency data associated with locations that are within the geofence associated with the ESP (also referred to as "egress filtering"). In some embodiments, geofences are used in routing emergency data that is pushed to an emergency data recipient. In some embodiments, for example, as mentioned above, an emergency data recipient 130 may subscribe to an ESP jurisdiction, or specifically to a geofence associated with the ESP (often times the authoritative jurisdiction of the ESP). Then, when the ERDP 110 receives emergency data associated with a location that is within the geofence to which the emergency data recipient has subscribed, the ERDP 110 can instantly and automatically push the emergency data to the emergency data recipient.

Emergency Flow Management System

In some embodiments, as depicted in FIG. 1, the emergency response data platform (ERDP) includes an emergency flow management system (EFMS). Generally, the EFMS functions to provide digital connectivity to emergency services to devices and applications otherwise unable to access them. Using the EFMS, an administrator of a device or application can access an emergency flow editor (also referred to as an "emergency console"), select a default emergency flow or define their own custom emergency flow, and receive an emergency flow trigger script including an emergency flow identifier (also referred to as an "emergency flow ID") unique to their chosen emergency flow. The emergency flow trigger script can then be quickly and easily integrated into the administrator's device or application. When the emergency flow trigger script is executed by the administrator's device or application, an electronic notification including the emergency flow ID is transmitted to an endpoint provided by the EFMS, which prompts the EFMS to execute the associated emergency flow chosen by the administrator.

An emergency flow may prompt the EFMS to perform a variety of functions, including (but not limited to) transmitting a notification to an emergency contact, transmitting a request for emergency service to an emergency service provider (ESP), establishing an emergency communication bridge to facilitate a Voice over Internet Protocol (VoIP) call between two or more participants, transmitting emergency data to one or more emergency data recipients, or any combination thereof, depending on the administrator's intended use case. In some embodiments, the emergency console provides a set of default emergency flows to choose from. In some embodiments, the emergency console provides a graphical user interface (GUI) that a user (e.g., an administrator of a device or application) can user to create a custom emergency flow. In some embodiments, the GUI of the emergency console allows a user to create a custom emergency flow by dragging and dropping (or otherwise manipulating) graphical representations of emergency flow building blocks into various arrangements, which prompts the EFMS to automatically generate an emergency flow according to the arrangement of the emergency flow building blocks. In some embodiments, an emergency flow building block is defined by a short script (e.g., a compilation or block of written programming commands), written in a programming language, that contains instructions for executing one or more functions. In some embodiments, when a user arranges one or more emergency flow building blocks within the GUI of the emergency console, the EFMS generates an emergency flow according to the arrangement of the one or more emergency flow building blocks by compiling the short scripts defining each of the one or more emergency flow building blocks into a single emergency flow script. In some embodiments, the emergency console allows a user to edit or create an emergency flow script directly (e.g., without the use of graphical representations of emergency flow building blocks, such as by inputting written program commands directly into a programming language input field).

Figure 2:
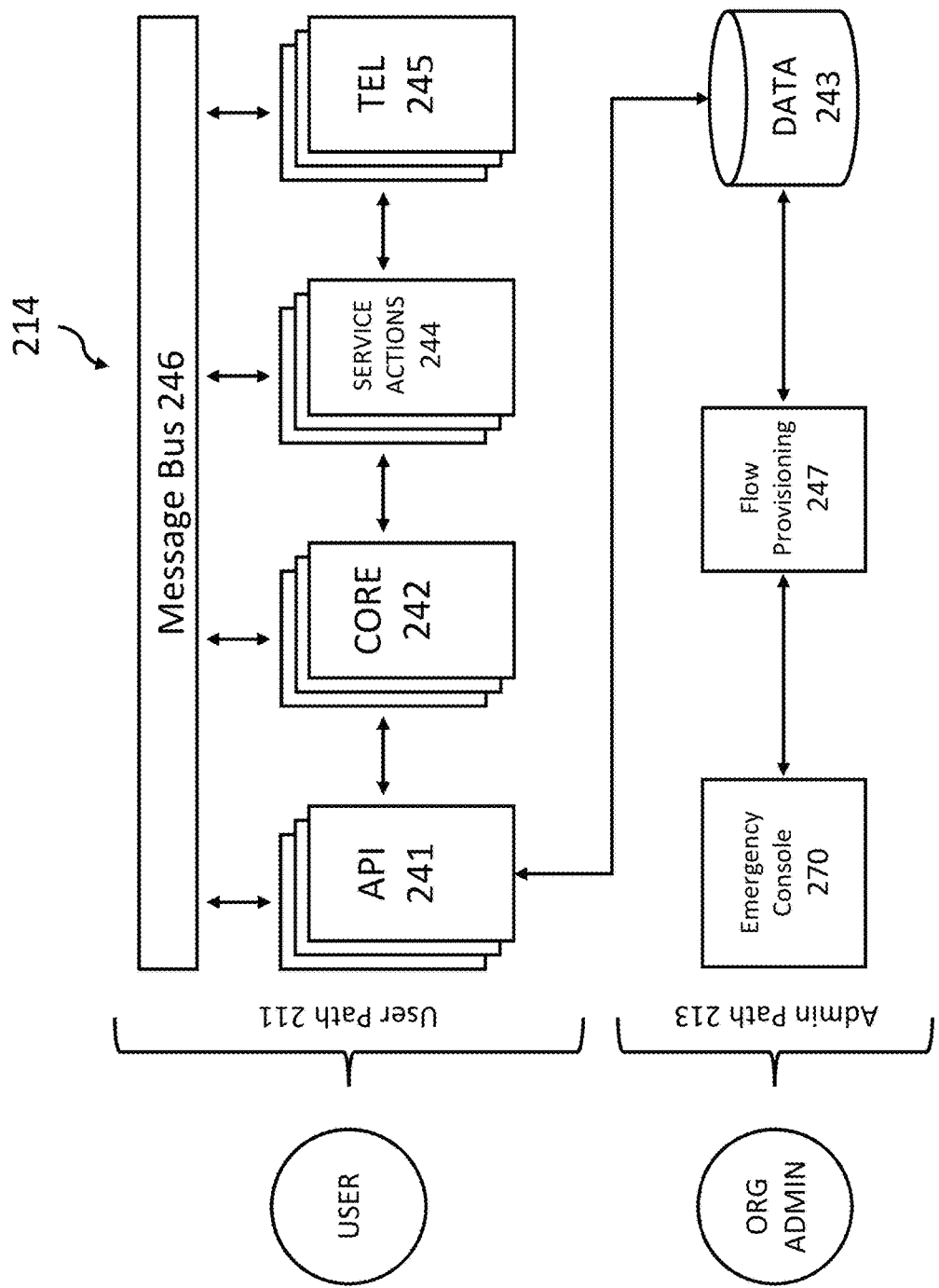
FIG. 2 depicts a diagram of an emergency flow management system (EFMS) in accordance with one embodiment of the present disclosure.

FIG. 2 depicts a non-limiting embodiment of an emergency flow management system (EFMS). As depicted in FIG. 2, in some embodiments, the EFMS contains two pathways: an administrator pathway 213 (admin path) and a user pathway 211 (user path). The admin path 213 is initiated by an administrator of a device or application, as described above. In the admin path, the administrator accesses an emergency flow editor 270 to configure an emergency flow to fit the needs of the administrator's product or service. In some embodiments, in the admin path, an emergency flow provisioning module 247 compiles the emergency flow into an emergency flow script, assigns an emergency flow ID to the emergency flow script, and stores the emergency flow script within a data module 243. Finally, the EFMS provides the administrator with an emergency flow trigger script including the emergency flow ID, which the administrator can integrate into their device or application. The user path 211 is initiated by a user, or a device associated with a user, of the product or service provided by the administrator. In some embodiments, in the user path, the API module 241 receives an electronic notification including the emergency flow ID from a device or application that the administrator has integrated the emergency flow trigger script into. In some embodiments, the API module 241 then references the data module 243 with the emergency flow ID to identify the emergency flow script corresponding to the emergency flow ID and delivers the emergency flow script to the core module 242 for execution. In some embodiments, the core module 242 then employs the service actions module 244 and the telephony module 245 to execute the various functions included in the emergency flow script. In some embodiments, the API module 241, the core module 242, the service actions module 244, and the telephony module 245 are separately and simultaneously in communication with the message bus 246, which facilitates and coordinates synchronous and asynchronous communication functions (e.g., a communication bridge, text messages, etc.) between the modules and various users and accounts (e.g., a user, emergency contacts, emergency responders, etc.). In some embodiments, the electronic notification including the emergency flow ID also contains emergency data, such as user data, location data, or any other additional data, according to the administrator's use case. In some embodiments, emergency data ingested by the EFMS is received and shared by the emergency clearinghouse, as described above.

Emergency Response Application

As mentioned above, in some embodiments, data and information is shared between the emergency response data platform (ERDP) and an emergency service provider (ESP) through an emergency response application. In some embodiments, as described in further detail below, the emergency response application may additionally be provided to an ESP to: a) facilitate communications between the ESP and an emergency caller (e.g., a person requesting emergency assistance) or b) facilitate communications between the ESP and one or more other ESPs. In some embodiments, the emergency response application is a software application either installed on a computing device at the ESP or accessed via the internet through a web browser on the computing device (e.g., the emergency response application is hosted on a cloud computing system by the ERDP). In some embodiments, the emergency response application functions to both facilitate a two-way communication link between the ERDP and the ESP and visualize data (e.g., emergency data) received by the ESP from the ERDP. The emergency response application optionally includes various components, such as a frontend application (hereinafter "graphical user interface" or "GUI"), a backend application, an authorization module, and a user database. In some embodiments, the emergency response application additionally or alternatively includes a credential management system or a geofence system (which may include or be otherwise communicatively coupled to a credentials database or a geofence database). In some embodiments, the credential management system and the geofence system are external to the emergency response application and communicatively coupled to the emergency response application (e.g., the credential management system or geofence system can be housed or hosted on a cloud computing system by the ERDP). Any or all of the components of the emergency response application may be hosted on a cloud computing system by the ERDP, a computing device at an ESP, or some combination thereof.

In some embodiments, the emergency response application is a webpage or web application that can be accessed through an internet or web browser. In such embodiments, the emergency response application can be quickly and easily integrated into the systems used by emergency service providers (ESPs), such as public safety answering points (PSAPs), because accessing and using emergency response application requires no additional software or hardware outside of standard computing devices and networks. As previously discussed, one of the greatest hinderances that PSAPs face in providing emergency assistance to people experiencing emergency situations is in acquiring accurate locations of the emergencies and the people involved, because PSAPs are currently typically limited to verbally asking for and verbally receiving locations from callers. In some embodiments, the clearinghouse is capable of receiving accurate locations (as well as additional emergency data, as described above) from electronic devices such as smartphones and delivering the accurate locations to the appropriate PSAPs during emergency situations. Therefore, it is advantageous to provide the emergency response application to PSAPs in the form of a webpage accessible through a standard web browser, in order to provide the potentially life-saving information stored within the clearinghouse to those capable of providing emergency assistance as quickly and easily as possible. However, in some embodiments, the emergency response application is a software application installed on a computing device at an ESP. The emergency response application may be provided by the ERDP or by a third-party.

Figure 3:
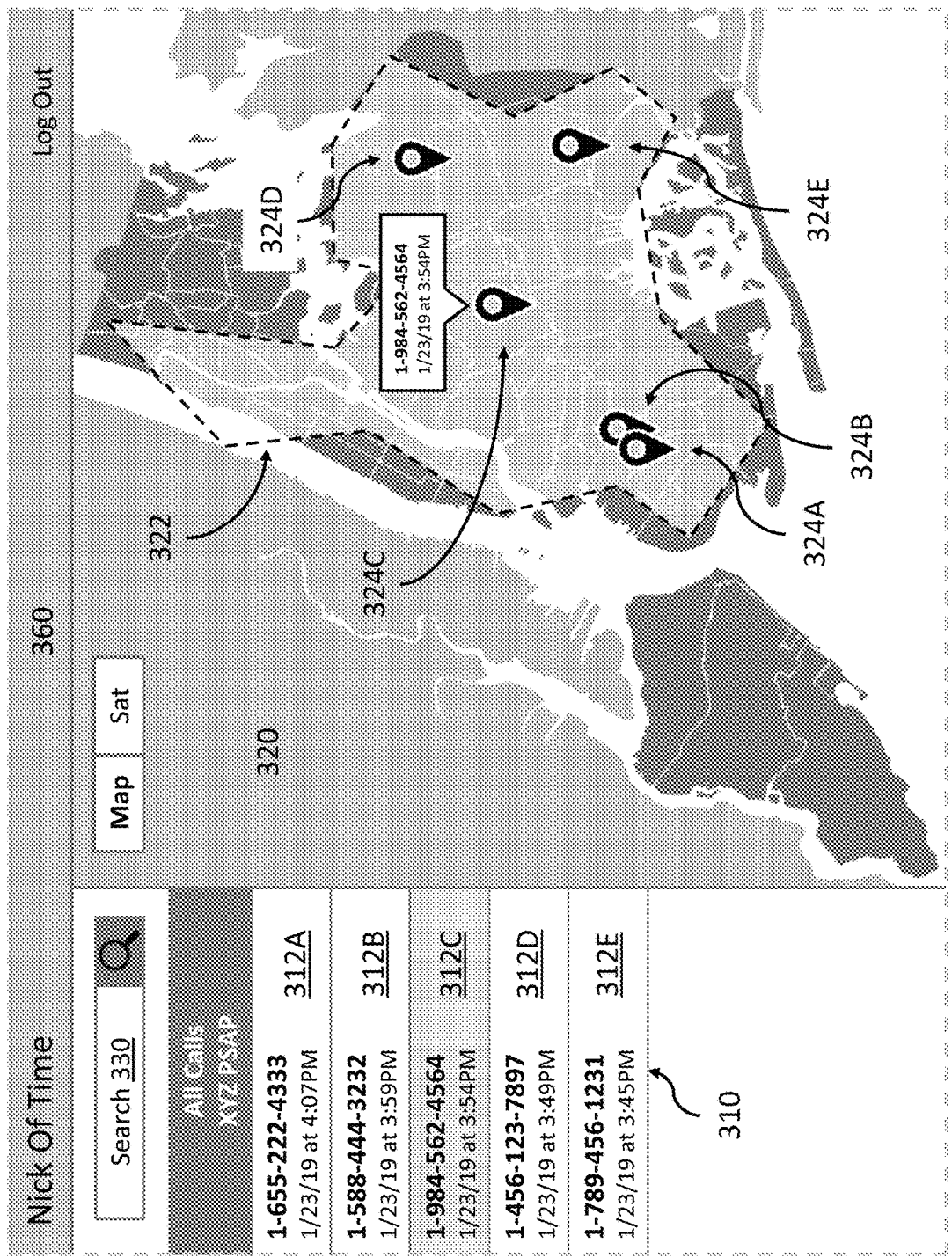
FIG. 3 illustrates an example of a graphical user interface (GUI) of an emergency response application in accordance with one embodiment of the present disclosure.

FIG. 3 illustrates an embodiment of a graphical user interface (GUI) provided by an emergency response application 360. In some embodiments, the GUI provides interactive elements that allow a user at an ESP to receive data from the ERDP, visualize data received from the ERDP, and transmit data to the ERDP. For example, in some embodiments, the GUI includes an entry field 330 through which a user can submit a device identifier, such as by typing or pasting the device identifier into the entry field 330. In some embodiments, after submitting a device identifier through the entry field 330, the user can prompt the emergency response application to generate and send an emergency data request by selecting a search button. The emergency response application 360 then generates an emergency data request including the device identifier and any other necessary information (e.g., a temporary access token) and transmits the emergency data request to the ERDP. The ERDP can then return any available emergency data associated with the device identifier to the emergency response application 360, as described above and below. In another example, in some embodiments, the emergency response application 360 can automatically receive emergency data from the ERDP for emergencies relevant to an ESP (e.g., emergencies located within the jurisdiction of the ESP) without requiring a user to generate an emergency data request, as described above and below. After receiving emergency data from the ERDP, the emergency response application 360 can then visualize the emergency data within the GUI of the emergency response application 360. For example, in some embodiments, the emergency response application 360 includes a list of incidents 310 and an interactive map 320, as illustrated by FIG. 3. As shown, in some embodiments, when the emergency response application 360 receives a location (e.g., an emergency location) and a device identifier associated with an emergency occurring within the jurisdiction 322 of the receiving ESP, the emergency response application 360 displays the location associated with the emergency within the interactive map 320 as a location marker 324 (also referred to as an "incident location") and displays the device identifier associated with the emergency within the list of incidents 310 as an incident 312.

In addition to emergency locations, the emergency response application 360 can receive and visualize numerous types of emergency data from the ERDP. For example, the emergency response application 360 can receive additional data regarding an emergency, such as demographic or medical data associated with a person involved in the emergency (e.g., an emergency caller). In another example, the emergency response application 360 can receive data from sensors associated with the emergency, such as heart-rate data collected by a sensor on an emergency caller's smartwatch. Or, for example, the emergency response application 360 can receive data regarding emergency response assets available for an emergency, as described below. In some embodiments, the emergency response application receives and visualizes messages received from emergency callers or other ESPs, as described below. The emergency response application 360 can visualize any emergency data received from the ERDP within the GUI of the emergency response application.

Emergency Data Transmission

Figure 4A:
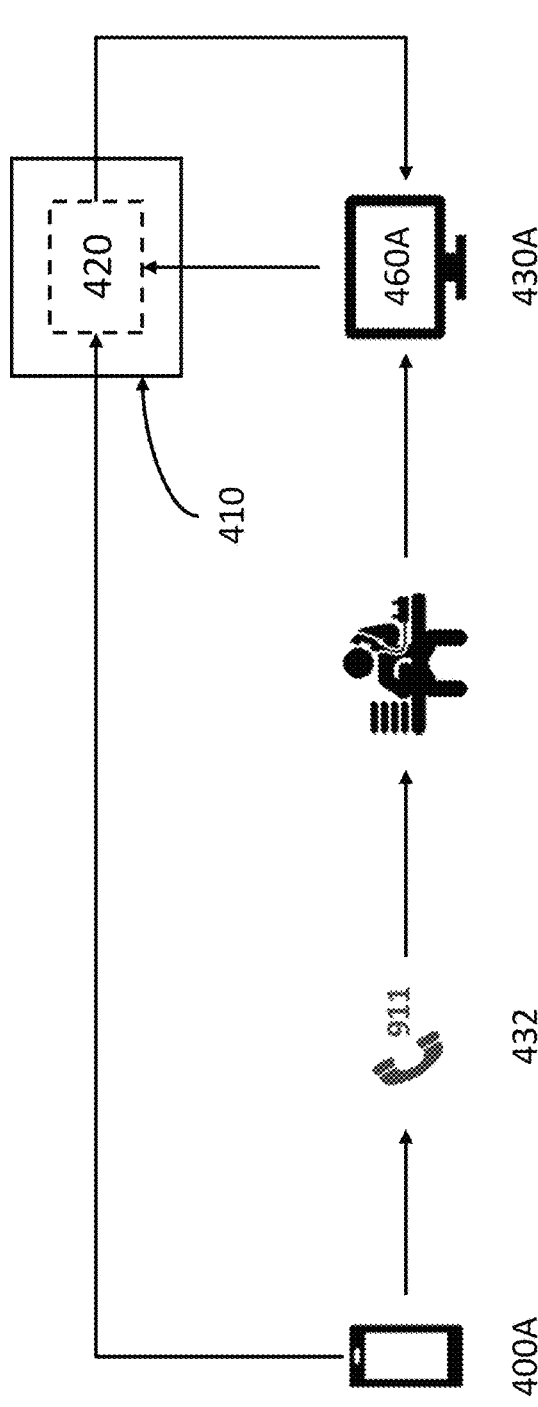
FIG. 4A and FIG. 4B depict flow diagrams of methods and systems for receiving and sharing emergency response data by an emergency response data platform in accordance with some embodiments of the present disclosure.
Figure 4B:
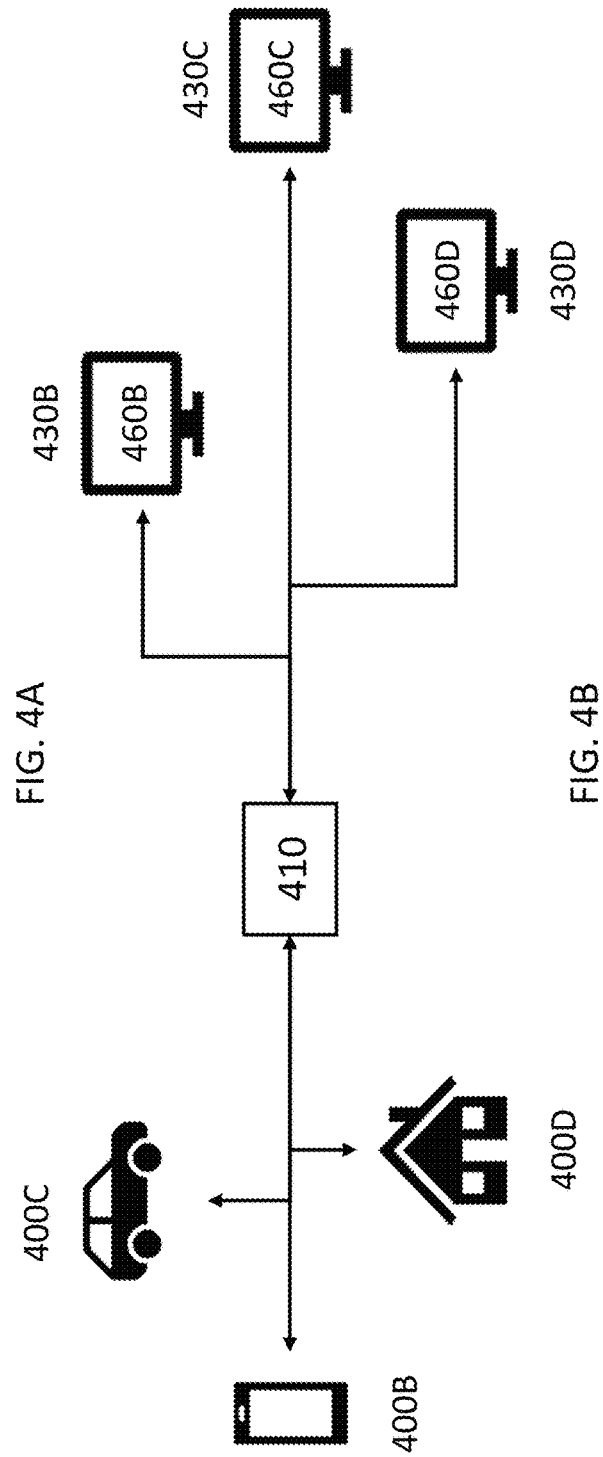

FIGS. 4A and 4B depict systems and processes for receiving and transmitting emergency data by an emergency response data platform in accordance with some embodiments of the present disclosure. As described above, in some embodiments, an emergency response data platform (ERDP) maintains a clearinghouse that obtains and shares emergency data to aid emergency service providers (ESPs) in responding to emergencies. For example, as depicted in FIG. 4A, during an emergency, an ESP 430A can send a query for emergency data (also referred to as an "emergency data request") to the ERDP 410 (e.g., through an emergency response application 460A, as described above) for a particular emergency, and, in response, the ERDP 410 can send any available emergency data associated with the emergency back to the ESP 430A (such as through emergency response application 460A). In some embodiments, as described above, the emergency response application 460A includes an identifier associated with an emergency alert in the emergency data request. The ERDP 410 can then use the identifier associated with the emergency alert to retrieve emergency data associated with the emergency alert from the clearinghouse 420. For example, as described above, an ESP 740A (e.g., a public safety answering point (PSAP)) can receive an emergency alert in the form of a 9-1-1 phone call 432 (representative of an emergency or potential emergency) from a mobile phone 400A associated with a phone number (e.g., (555) 555-5555). The ESP 430A can then send an emergency data request including the phone number (i.e., the identifier associated with the emergency alert) to the ERDP 410, which can then retrieve any emergency data within the clearinghouse 420 associated with the phone number and return the available emergency data to the requesting ESP 430A. This process of returning emergency data to an ESP in response to an emergency data request is referred to as "pulling" emergency data from the clearinghouse.

As described above, in some embodiments, the emergency response data platform (ERDP) can "push" emergency data from the Emergency Clearinghouse to emergency service providers (ESPs), such as by using an emergency data subscription system (hereinafter, "subscription system"). FIG. 4B depicts a flow diagram of a process for pushing emergency data from the Emergency Clearinghouse to one or more ESPs. In some embodiments, a member of an ESP (e.g., a PSAP staff member) logs into the emergency response application 460B at an ESP system 430B (e.g., a computing device associated with the ESP) by accessing the emergency response application 460B (e.g., by navigating to the emergency response application 460B through a web browser) and submitting their login information through the GUI of the emergency response application 460B. In some embodiments, when the ESP member logs into the emergency response application 460B by submitting their login information, the emergency response application 460B or ERDP 410 then determines an ESP account ID associated with the ESP member's account and establishes a persistent or active communication link (e.g., a websocket connection) with the ESP system 430B, thereby automatically subscribing the ESP console to the ESP account ID for the duration of their login session. Then, as described above, when the ERDP 410 receives an emergency alert including a location (e.g., when an emergency call is made from an electronic device 400B and sends an emergency alert to the ERDP 410 including a location generated by the electronic device 400B), the ERDP 410 retrieves a geofence associated with every ESP registered with the ERDP 410 and determines if the location falls within any of the geofences. In response to determining that the location falls within a geofence associated with the ESP associated with the ESP account ID, the ERDP 410 then associates the location with the ESP account ID, determines if there are any active or persistent communication links between the ERDP 410 and any computing devices subscribed to the ESP account ID. In this instance, because the ESP system 430B is subscribed to the ESP account ID and actively linked to the ERDP 410 through the persistent or active communication link, the ERDP 410 automatically pushes (e.g., from the clearinghouse) the emergency alert or emergency data associated with the emergency alert (e.g., the location, a phone number, etc.) to the ESP system 430B for display within the emergency response application 460B. In some embodiments, emergency alerts or emergency data associated with emergency alerts that have been pushed to an ESP are displayed within a jurisdictional awareness view, as described below.

For example, ESP system 430B and ESP system 430C are two different ESP consoles associated with the same ESP (e.g., two computing devices at the same public safety answering point (PSAP)), PSAP A. ESP system 430D is associated with a second ESP, PSAP B. One day, PSAP call-takers access and successfully log into the emergency response application 460 (emergency response application 460D-460D) at each of the three ESP system (ESP systems 430B-430D), thereby establishing three separate active communication links, one active communication link between the ERDP 410 and each of the three ESP consoles. The ESP consoles are automatically subscribed by the ERDP 410 to the ESP account IDs associated with their respective ESPs (ESP ID A for PSAP A and ESP ID B for PSAP B). Both PSAP A and PSAP B are associated with only one geofence, geofence A and geofence B, respectively. Geofences A and B do not overlap (often the case for adjacent primary agencies). The geofences have previously been tagged within the ERDP 410 with their respective ESP account IDs (e.g., during a registration process for the emergency response application). It is contemplated that an ESP (e.g., a PSAP) may be associated with one or more geofences or sub-geofences. For example, one geofence associated with an ESP may represent the ESP's authoritative jurisdiction for emergency calls while another geofence associated with an ESP may represent the ESP's authoritative jurisdiction for emergency text messages (e.g., text messages sent to 911). In another example, an ESP agency may have a specific geofence for responding to a specific type of emergency, e.g., medical emergency geofence.

Later that day, an emergency call is made from communication device 400B, which causes communication device 400B to generate a first emergency alert including a first location of the communication device 400B and transmit the first emergency alert to the ERDP 410. When the ERDP 410 receives the first emergency alert, the ERDP 410 retrieves some or all of the geofences stored within the ERDP 410 and determines if the first location falls within any of the geofences stored within the ERDP 410. In this example, the ERDP 410 determines that the first location falls within geofence A, associated with PSAP A. In response, the ERDP 410 tags the first location with the ESP account ID associated with geofence A, ESP ID A. The ERDP 410 then determines if there are any active communication links between the ERDP and any ESP consoles subscribed to ESP ID A and automatically pushes (e.g., from the clearinghouse) the first emergency alert to those ESP consoles. In this example, both ESP system 430B and ESP system 430C are subscribed to ESP ID A, so the ERDP 410 automatically pushes the first emergency alert to both ESP system 430B and ESP system 430C for display within emergency response applications 460B and 460C, respectively, such as through a jurisdictional awareness view (as described below). The first location does not fall within geofence B, because geofence A and geofence B do not overlap, so the first emergency alert is not pushed to ESP system 430D, even though an active communication link has been established between the ERDP 410 and ESP system 430D.

Three minutes later, the ERDP 410 receives an emergency alert from electronic device 400D (e.g., a home security system) including a second location of the electronic device 400D. When the ERDP 410 receives the second emergency alert, the ERDP again retrieves some or all of the geofences stored within the ERDP 410 and determines if the second location falls within any of the geofences stored within the ERDP 410. In this example, the ERDP 410 determines that the second location falls within geofence B, associated with PSAP B. In response, the ERDP 410 tags the second location within the ESP account associated with geofence B, ESP ID B and automatically pushes the second emergency alert to ESP system 430D for display within emergency response application 460D, because ESP system 430D has an active communication link established with the ERDP 410 and ESP system 430D is subscribed to ESP ID B. The ERDP 410 does not push the second emergency alert to ESP system 430B or ESP system 430C. Although ESP system 430B and ESP system 430C have active communication links established with the ERDP 410, they are not subscribed to ESP ID B, and geofence A and geofence B do not overlap, meaning the second location does not fall within geofence A. Two minutes after that, the ERDP 410 receives an emergency alert from electronic device 400C (e.g., an intelligent vehicle system) including a third location of the electronic device 400C. The ERDP 410 determines that the third locations falls within geofence A (like the first location included in the first emergency alert) and thus automatically pushes the third emergency alert to both ESP system 430B and ESP system 430C for display within emergency response application 460B and 460C. In some embodiments, emergency response application 460B and emergency response application 460C display the first emergency alert and the third emergency alert simultaneously, such as through a jurisdictional awareness view, as described below.

Jurisdictional Awareness View

In some embodiments, the systems, applications, servers, devices, methods, and media of the instant application provide a jurisdictional awareness view within the emergency response application. In some embodiments, the jurisdictional awareness view enables an ESP to view one or more ongoing or recently received emergency alerts (e.g., emergency calls) within one or more geofenced jurisdictions. Although not show, digital emergency alerts based on alarms or sensors, activation of a panic button, etc. may be displayed in a similar fashion wherein the emergency alerts do not represent emergency calls. FIG. 3 illustrates the jurisdictional awareness view displayed within the emergency response application, in accordance with one embodiment of the present disclosure. In some embodiments, the jurisdictional awareness view includes a list of incidents 310 that displays one or more incidents 312 associated with one or more device identifiers (e.g. phone numbers, IP addresses). In some embodiments, the jurisdictional awareness view additionally or alternatively includes an interactive map 320 that displays one or more incident locations 324 associated with the one or more incidents 312 associated with the one or more device identifiers, as described below. In some embodiments, the jurisdictional awareness view displays incidents and incident locations only for emergencies occurring within the jurisdiction 322 of the ESP at which the emergency response application 360 is being accessed.

For example, in the example illustrated in FIG. 3, an ESP has accessed an emergency response application 360 provided by the ERDP. In this example, the ERDP has pushed emergency data associated with five different emergency alerts to the ESP (as described above) through the emergency response application 360. Accordingly, the emergency response application 360 displays five different incidents 312 (e.g., incidents 312A-312E) within the list of incidents 310 and five corresponding incident locations 324 (e.g., incident locations 324A-324E) within the interactive map 362. As illustrated by FIG. 3, in some embodiments, incidents 312 and incident locations 324 may be selected or hovered over to highlight a particular incident 312. In this example, incident 312C and its corresponding incident location 324C have been selected and highlighted. In some embodiments, selecting a particular incident 312 or corresponding incident location 324 prompts the emergency response application 360 to display additional information associated with the particular incident 312 (e.g., additional emergency data or information associated with the emergency alert for which the particular incident 312 was created). Because the jurisdictional awareness view can show an ESP numerous incidents 312 occurring within the jurisdiction 322 of the ESP simultaneously, the jurisdictional awareness view can provide the ESP with situational awareness that the ESP otherwise would not have. For example, with the knowledge that incidents 312A and 312B originated in close proximity and at approximately the same time, an ESP personnel (e.g., a call taker at a public safety answering point) can determine that the two incidents may be related.

Low Acuity Dispatch Management

Disclosed herein are methods and systems for low acuity dispatch management. Generally, when a person experiencing a medical emergency requests emergency service from an emergency service provider (such as by dialing 9-1-1 in the United States), the emergency service provider (ESP) has only two options at their disposal: 1) dispatching an ambulance (also referred to as a "transport") or 2) dispatching no response at all. Dispatching an ambulance is an expensive and resource-consuming endeavor for all parties involved, but, because of these limited options, there are a great many instances in which an ESP (e.g., a public safety answering point (PSAP)) is effectively forced to dispatch an ambulance to non-emergent situations or so-called "low acuity" medical emergencies that do not actually require a trip to a hospital emergency room. For example, an emergency caller who has fallen and sprained his shoulder may be better off visiting a medical clinic than heading to an ER in an ambulance. Or for example, an emergency caller experiencing intense nausea may be better off talking to a doctor over the phone. However, a PSAP often has no choice other than dispatching an ambulance to either of these two emergency callers. The result is a potentially expensive and wasteful use of emergency resources.

Figure 5:
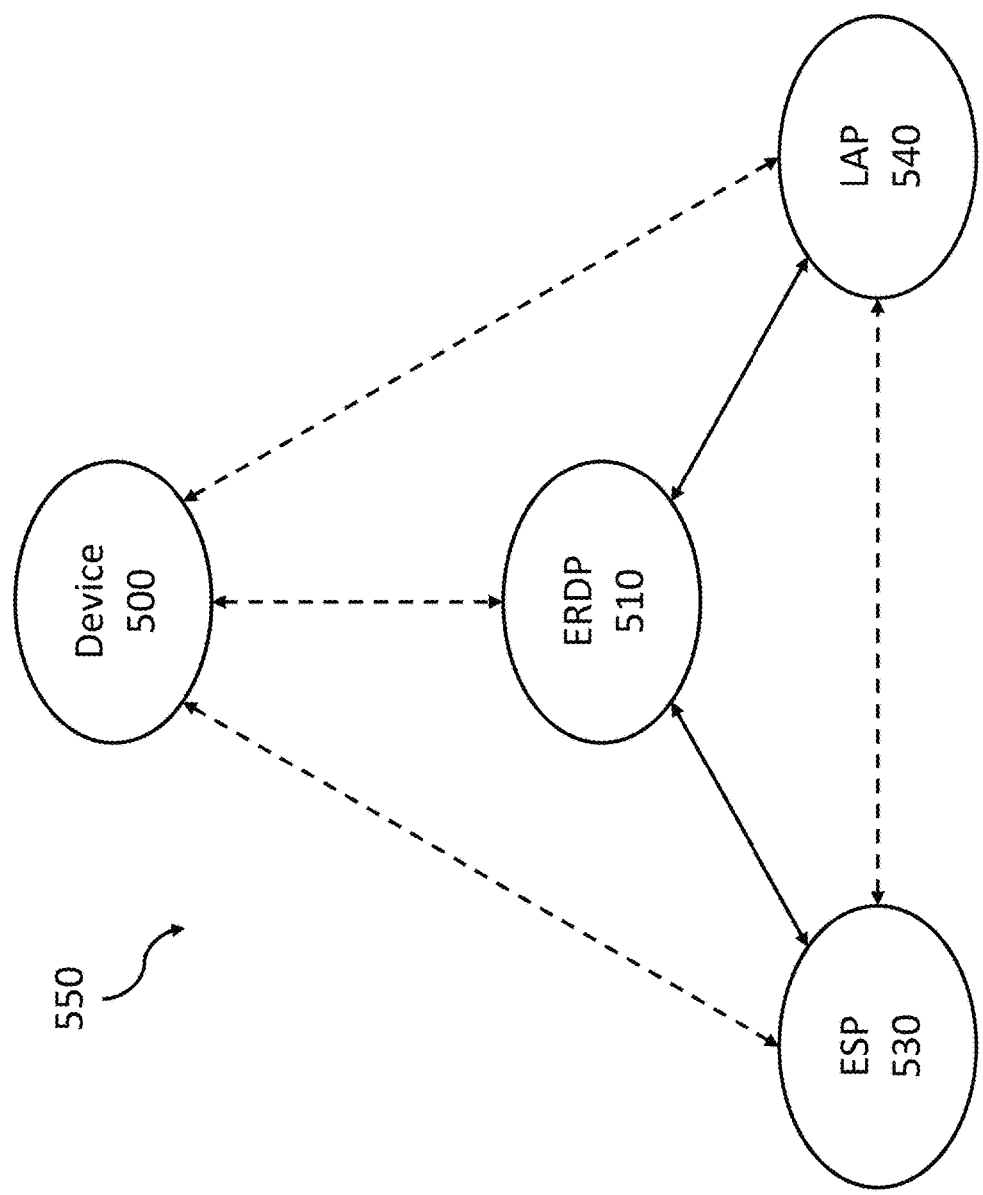
FIG. 5 depicts a diagram of a system for low acuity dispatch management in accordance with one embodiment of the present disclosure.

Furthermore, there are many low acuity emergency service providers (hereinafter, "low acuity provider" or LAP) prepared to treat low acuity emergencies, such as medical clinics and telemedicine providers (e.g., nurses and doctors that offer virtual visits, such as through voice and video calls). However, these LAPs generally have no connectivity to ESPs; therefore, a person in an emergency must contact an LAP directly, which is often unlikely because of many peoples' predisposition to contacting an ESP (e.g., by dialing 9-1-1) during an emergency. Thus, it would be desirable to provide a system for connecting LAPs with ESPs, in order to provide ESPs with a wider range of dispatch options for more efficiently and effectively responding to medical emergencies. FIG. 5 depicts a system 550 for low acuity dispatch management. In some embodiments, as depicted by FIG. 5, the system 550 includes a communication device 500 (as described above), an emergency service provider (ESP) 530 (as described above), a low acuity provider (LAP) 540, and an emergency response data platform (ERDP) 510 (as described above). In some embodiments, as depicted by FIG. 5, the ERDP 510 serves a communication nexus for communication devices 500, ESPs 530, and LAPs 540. In some embodiments, the ERDP 510 is communicatively coupled to a communication device 500, an ESP 530, and an LAP 540. In some embodiments, the ERDP 510 is only communicatively coupled to an ESP 530 and an LAP 540.

While low acuity providers and low acuity dispatch management are primarily described herein in the context of medical emergencies, it will be understood that the method and systems disclosed may be applied in similar and equally advantageous ways to different types of emergencies. For example, in the analogous context of personal emergencies (i.e., emergencies that are not medical or fire in nature), emergency service providers often have only two options are their disposal: 1) dispatching police units or 2) dispatching no response at all. However, there are many instances of "low acuity" personal emergencies that may not need a police response (e.g., non-violent domestic or civil disputes). Instead, the personal emergency may be more effectively responded to by low acuity emergency service providers such as a social worker or a crisis management team. In the same way that the systems and methods disclosed herein connect low acuity providers prepared to treat medical emergencies with ESPs, the very same systems and methods can be used to connect low acuity providers prepared to treat personal emergencies (or any other type of emergency) with ESPs.

Figure 6:
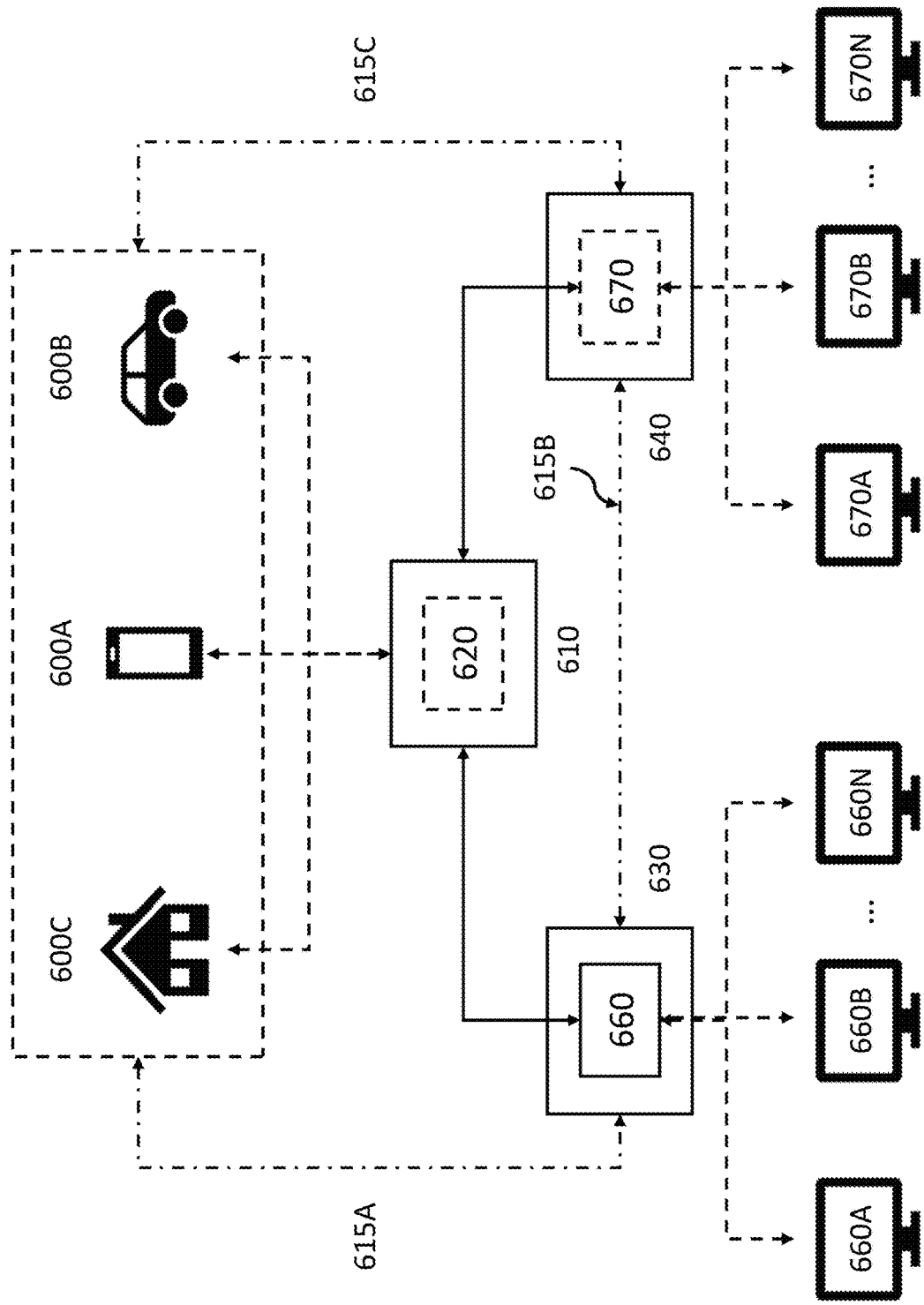
FIG. 6 depicts a diagram of a system for facilitating low acuity emergency dispatch by an emergency response data platform in accordance with one embodiment of the present disclosure.

Generally, as mentioned above, while communication devices are capable of generating or otherwise gathering a tremendous amount of digital information (e.g., emergency data), connectivity between communication devices and emergency service providers (ESPs) is limited to analog voice calls (e.g., 9-1-1 calls). Connectivity between low acuity emergency service providers (LAPs) is similarly limited (as described above). As disclosed herein, in various embodiments, an emergency response data platform (ERDP) functions to receive and transmit data and information (e.g., emergency data) between communication devices, ESPs, and LAPs. FIG. 6 depicts various embodiments of an ERDP 610 communicatively connected to communication devices 600, ESPs 630, and LAPs 640. In some embodiments, the ERDP 610 provides endpoints for receiving data from communication devices 600, such as via an application programming interface (API) (e.g., through a clearinghouse 620, as described above). In some embodiments, the ERDP 610 provides a mobile or web application that a communication device 600 can use to transmit data to the ERDP 610. In some embodiments, a communication device 600 transmits data to a backend server (e.g., a cloud computing system associated with the communication device 600) to which the communication device 600 is communicatively connected, and the backend server transmits the data to the ERDP 610 in turn. In some embodiments, the ERDP 610 can transmit data or information to a communication device 600 via a backend server communicatively coupled to the communication device 600, via a web or mobile application provided by the ERDP 610 and accessed by the communication device 600, or via a phone call (e.g., cellular or Voice over Internet Protocol (VoIP)) or text message (e.g., SMS or MMS). However, the ERDP 610 may communicate with a communication device 600 in any other way. In some embodiments, an ESP 630 can transmit data to the ERDP 610 through an ESP application (as described above; e.g., a CAD system) accessed by a computing device at the ESP 630 that is communicatively coupled to the ERDP 610, such as via an API. In some embodiments, the ERDP 610 provides an emergency response application 660 (as described above) that the ESP 630 can user to transmit data to the ERDP 610. In some embodiments, the ERDP 610 can transmit data or information to an ESP 630 via an ESP application communicatively coupled to the ERDP 610 or an emergency response application 660 provided to and accessed by the ESP 630. However, the ERDP 610 may communicate with an ESP 630 in any other way. In some embodiments, an LAP 640 can transmit data or information to the ERDP 610 through an LAP application (such as an LAP CAD system) accessed by a computing device at the LAP 640 that is communicatively coupled to the ERDP 610, such as via an API. In some embodiments, the ERDP 610 provides a low acuity response application 670 (as described below) that the LAP 640 can use to transmit data to the ERDP 610. In some embodiments, the ERDP 610 can transmit data or information to an LAP 640 via an LAP application communicatively coupled to the ERDP 610 or a low acuity response application 670 provided to and accessed by the LAP 640. In some embodiments, the ERDP 610 can transmit and receive data or information to and from an LAP 640 via a phone call (e.g., cellular or VoIP) or text message (e.g., SMS or MMS), as described below. However, the ERDP 610 may communicate with an LAP 640 in any other way. By establishing bidirectional communication channels between both communication devices 600 and ESPs 630, the ERDP 610 can provide an indirect communication link 615A between communication devices 600 and ESPs 630 (e.g., data and information transmitted to the ERDP 610 from communication devices 600 can be subsequently transmitted to ESPs 630, and vice versa). By establishing bidirectional communication channels between both ESPs 630 and LAPs 640, the ERDP 610 can provide an indirect communication link 615B between ESPs 630 and LAPs 640 (e.g., data and information transmitted to the ERDP 610 from ESPs 630 can be subsequently transmitted to LAPs 640, and vice versa). Finally, by establishing bidirectional communication channels between both communication devices 600 and LAPs 640, the ERDP 610 can provide an indirect communication link 615C between communication devices 600 and LAPs 640 (e.g., data and information transmitted to the ERDP 610 from communication devices 600 can be subsequently transmitted to LAPs 640, and vice versa). It is through these indirect communication links 615 that the ERDP 610 is able to function as a communication nexus between communication devices 600, ESPs 630, and LAPs 640.

As described above, when a person experiencing a medical emergency requests emergency service from an emergency service provider (ESP), such as by dialing 9-1-1, the ESP is generally only capable of dispatching an ambulance response or dispatching no response at all. There are many instances in which a low acuity response to the emergency (hereinafter, "low acuity dispatch") would be more effective and efficient for both the person experiencing the emergency (also referred to as an "emergency caller") and the ESP. In some embodiments, the ESP is provided with the ability to perform triage on a potential emergency such as transferring the caller to a suitable low acuity provider (LAP). In some embodiments, an LAP differs from an ESP in that an ESP is a public organization and an LAP is a private organization. In some embodiments, an LAP differs from an ESP in that an ESP can be reached by dialing a specifically designated emergency number (e.g., a three-digit emergency number, such as 9-1-1 in the United States) and an LAP cannot. In some embodiments, an LAP differs from an ESP in that an ESP can dispatch an ambulance or police unit and an LAP cannot. In some embodiments, an LAP is a nursing organization. In some embodiments, an LAP is a crisis management organization. In some embodiments, an LAP is a medical clinic. However, there may be many different kinds of LAPs that provide many different kinds of services.

Figure 7:
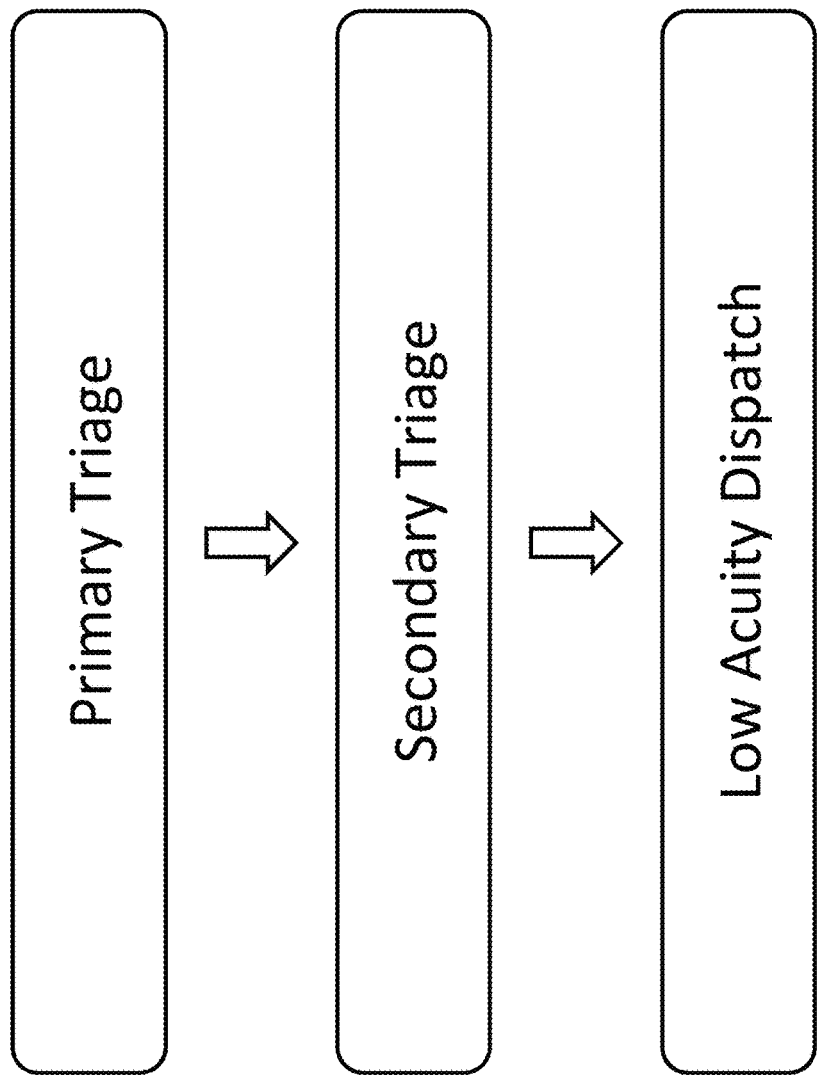
FIG. 7 depicts a process for low acuity dispatch in accordance with one embodiment of the present disclosure.

FIG. 7 depicts a non-limiting process for low acuity dispatch. In some embodiments, as depicted by FIG. 7, a process for low acuity dispatch includes three general steps: 1) Primary Triage; 2) Secondary Triage; and 3) Low Acuity Dispatch. In some embodiments, in the first step, Primary Triage, after receiving a request for emergency service for a medical emergency, an ESP must first determine if the medical emergency is a high acuity medical emergency (e.g., the emergency requires an ambulance dispatch) or a low acuity medical emergency (e.g., the emergency does not require an ambulance dispatch). In some embodiments, in the second step, Secondary Triage, if the medical emergency is a low acuity medical emergency, the ESP or a low acuity provider (LAP; as described above) must determine what specific type of low acuity response to the emergency is most appropriate. Finally, in some embodiments, in the third step, Low Acuity Dispatch, the ESP or the LAP dispatches the appropriate low acuity response. In some embodiments, the ERDP can autonomously perform one or more steps of the low acuity dispatch process (as described above). For example, in some embodiments, the ERDP can automatically or autonomously perform a Primary Triage and a Secondary Triage for a medical emergency using emergency data associated with the medical emergency that the ERDP receives from one or more emergency data sources associated with the medical emergency.

Figure 9:
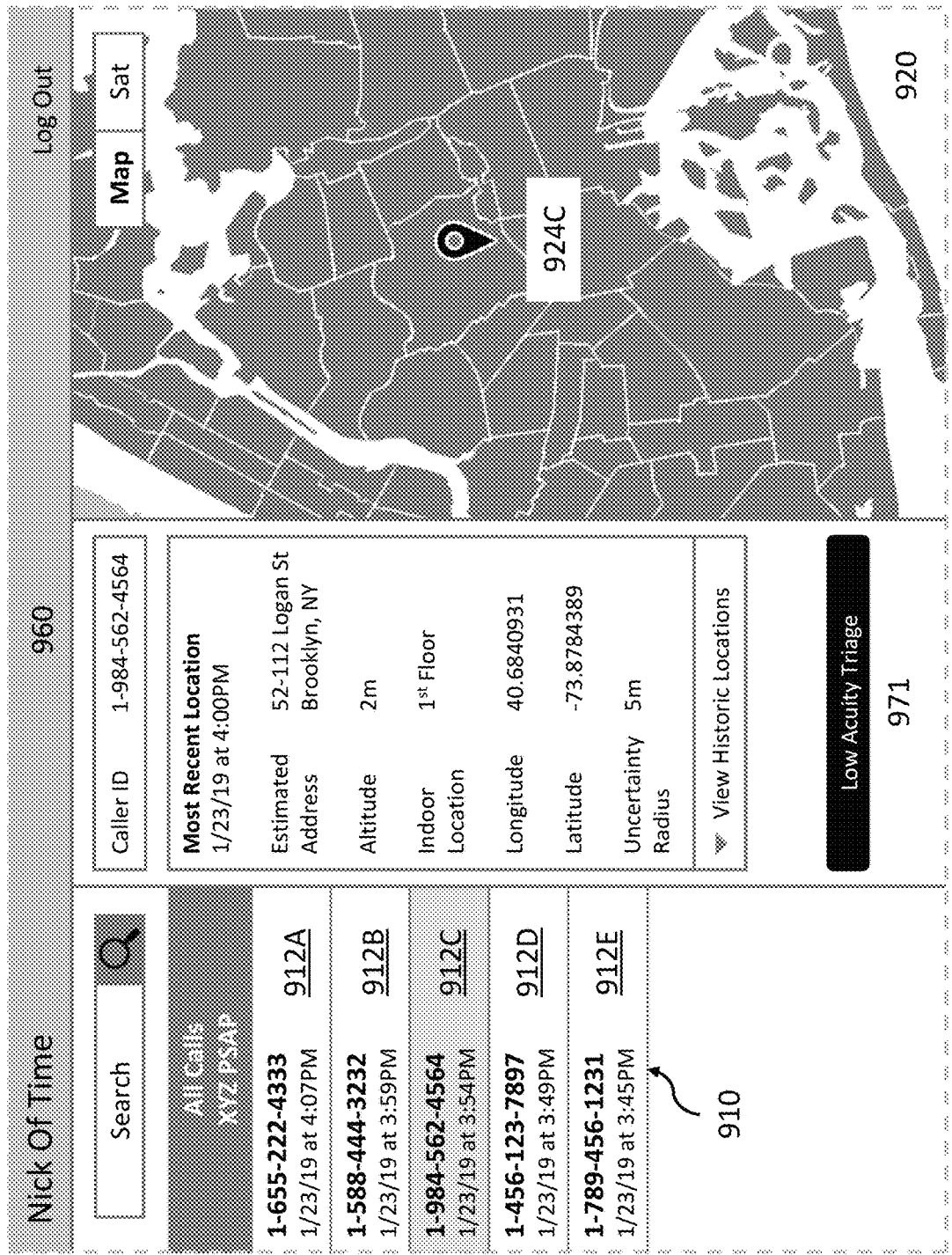
FIG. 9 illustrates an example of a GUI of an emergency response application in accordance with one embodiment of the present disclosure.

The goal of low acuity dispatch is to provide person-centered care, such that emergency callers receive a more appropriate level of care delivered safely at the right time and place, while having greater control of their health care through the availability of more options. For example, in some embodiments, when a person in a medical emergency requests emergency service by dialing 9-1-1, a call taker (also referred to as a "9-1-1 call taker") at a public safety answering point (PSAP) answers the emergency call and begins gathering information about the medical emergency from the emergency caller. The call taker can then perform a Primary Triage by determining if the medical emergency is a high acuity medical emergency or a low acuity medical emergency using the information about the medical emergency gathered from the emergency caller. For example, the call taker may step through a series of questions using a priority dispatch protocol. If the call taker determines that the medical emergency is a high acuity medical emergency, the call taker can continue with their normal dispatch process. However, if the call taker determines that the medical emergency is a low acuity medical emergency, the call taker can request low acuity triage, for example, by selecting a low acuity triage button 871 in an ESP application (e.g., a CAD system, as illustrated in FIG. 8) or a low acuity triage button 971 in an emergency response application 960 (as illustrated in FIG. 9) to initiate a Secondary Triage facilitated by the emergency response data platform (ERDP). Other interactive elements can be used in lieu of a button for selecting the low acuity triage option.

In some embodiments, selecting the low acuity triage button 871 within an ESP application (as illustrated in FIG. 8) prompts the ESP application to transmit a notification to the ERDP indicating that the ESP would like to initiate a Secondary Triage for the medical emergency. In some embodiments, in response to receiving the notification (also referred to as a "Secondary Triage notification" or a "request to initiate a low acuity response" or a "low acuity response request"), the ERDP establishes a communication bridge (such as by employing an emergency flow management system (EFMS), as described above), adds the emergency call between the emergency caller and the 9-1-1 call taker to the communication bridge, and then adds a low acuity provider (LAP; e.g., a medical triage line) to the communication bridge (e.g., by delivering a VoIP call to a phone number associated with the LAP). The emergency caller or the 9-1-1 call taker can then provide details of the medical emergency to the LAP verbally.

Alternatively, or in combination, in some embodiments, selecting the low acuity triage button 871 prompts the ESP application to transmit any available information regarding the medical emergency (e.g., contact information or details gathered and submitted into the ESP application by the 9-1-1 call taker) to the ERDP (e.g., separate to or as part of the Secondary Triage notification), which the ERDP can then transmit to the LAP. Using the information regarding the medical emergency received from the emergency caller, the 9-1-1 call taker, or the ERDP, the LAP can perform a Secondary Triage by determining an appropriate low acuity response for the medical emergency. Finally, the LAP can dispatch the appropriate low acuity response to the emergency caller.

In some embodiments, selecting the low acuity triage button 971 within an emergency response application 960 provided by the ERDP (as illustrated in FIG. 9) prompts the emergency response application 960 to transmit a Secondary Triage notification to the ERDP indicating that the ESP would like to initiate a Secondary Triage for the medical emergency. In some embodiments, in response to receiving the Secondary Triage notification, the ERDP establishes a communication bridge, adds the emergency call between the emergency caller and the 9-1-1 call taker to the communication bridge, and then adds an LAP to the communication bridge (as described above).

Alternatively, or in combination, in some embodiments, selecting the low acuity triage button 971 prompts the ERDP to transmit any available information regarding the medical emergency (e.g., enhanced location data or additional data associated with the emergency caller) to the LAP. Using information regarding the medical emergency received from the emergency caller, the 9-1-1 call taker, or the ERDP, the LAP can perform a Secondary Triage by determining an appropriate low acuity response for the medical emergency. Finally, the LAP can dispatch the appropriate low acuity response to the emergency caller.

Figure 10:
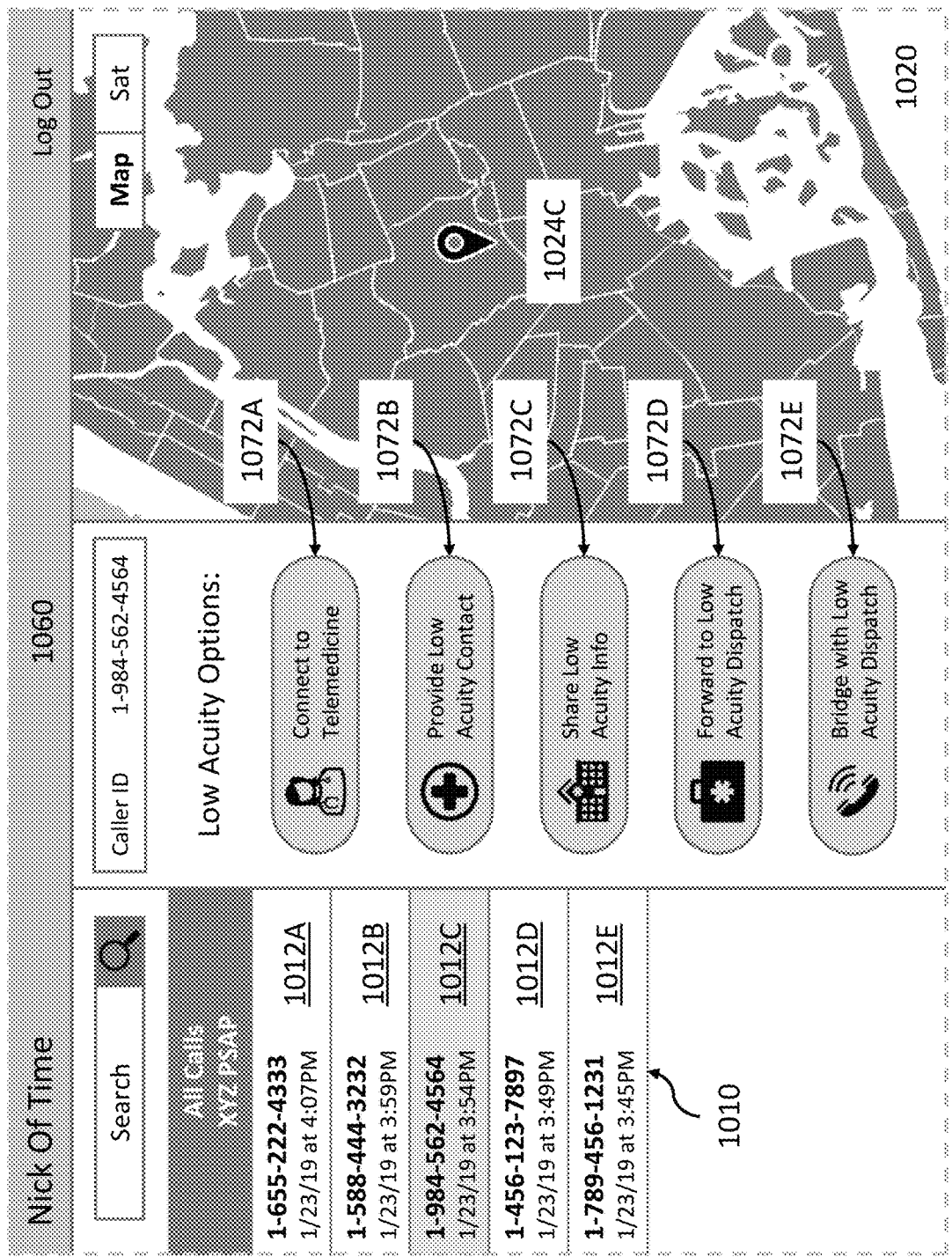
FIG. 10 illustrates an example of a GUI of an emergency response application in accordance with one embodiment of the present disclosure.

In some embodiments, selecting the low acuity triage button 971 within the emergency response application 960 prompts the emergency response application 960 to provide the ESP with a plurality of low acuity triage options 1072, as illustrated by FIG. 10. In some embodiments, low acuity triage options 1072 provided by the emergency response application 1060 include one or more options for initiating an external Secondary Triage (e.g., a Secondary Triage performed by an LAP, as opposed to a Secondary Triage performed by the ESP itself). For example, in the example illustrated by FIG. 10, the emergency response application 1060 provides a low acuity triage option 1072D for transmitting any available information regarding the medical emergency to an LAP (as described above) and a low acuity triage option 1072E for establishing a communication bridge including the emergency caller, the ESP, and an LAP (as described above). In some embodiments, low acuity triage options 1072 provided by the emergency response application 1060 include one or more options for dispatching a low acuity response. For example, in some embodiments, if the 9-1-1 call taker performs the Secondary Triage step themselves, the 9-1-1 call taker can select low acuity triage option 1072A to connect the emergency caller with a telemedicine provider (as described below), low acuity triage option 1072B to provide the emergency caller with contact information for an appropriate LAP, or low acuity triage option 1072C to share information regarding a plurality of LAPs to the emergency caller for the emergency caller to choose from. However, the ERDP and emergency response application 1060 may provide any number and any type of low acuity triage options 1072. In some embodiments, the emergency response application 1060 provides a plurality of low acuity providers from which the call taker can select an appropriate provider during the triage process. As an illustrative example, a call taker presses a low acuity triage option upon determining the emergency caller is experiencing a low acuity emergency, and is presented with a list of interactive elements corresponding to low acuity responders including a nurse triage line, a telemedicine provider, and a medical clinic line. The caller can then select the element for the suitable low acuity responder, which initiates the triage process.

Figure 11:
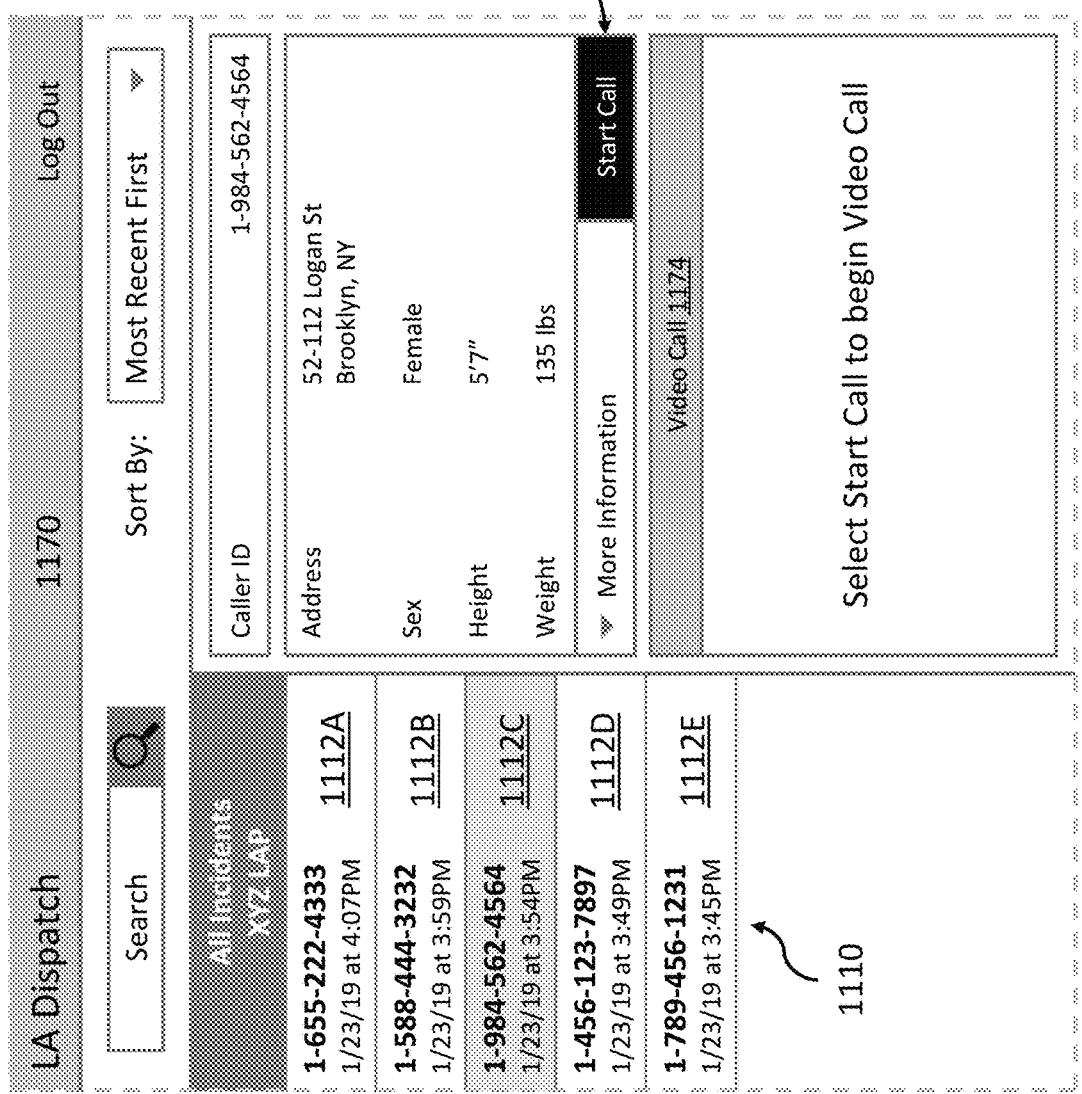
FIG. 11 illustrates an example of a GUI of a low acuity response application in accordance with one embodiment of the present disclosure.

As mentioned above, in some embodiments, after performing a Primary Triage (as described above) and determining that a medical emergency is a low acuity medical emergency, an emergency service provider (ESP; e.g., a public safety answering point (PSAP)) can perform a Secondary Triage (as described above) to determine an appropriate low acuity response to the medical emergency, or the ESP can transmit data or information regarding the medical emergency to a low acuity emergency service provider (LAP) for the LAP to perform a Secondary Triage. In some embodiments, as mentioned above, when an ESP selects to transmit emergency data regarding a medical emergency to an LAP, an emergency response data platform (ERDP) receives the data or information regarding the medical emergency from the ESP and transmits the data or information to the LAP. In some embodiments, as mentioned above, the ERDP provides a low acuity response application to the LAP and transmits the data or information regarding the medical emergency to the LAP through the low acuity response application. FIG. 11 illustrates a non-limiting embodiment of a graphical user interface (GUI) of a low acuity response application 1170. In some embodiments, as illustrated by FIG. 11, a low acuity response application 1170 includes a list of incidents 1110 that includes one or more incidents 1112 representing individual emergencies for which an LAP accessing the low acuity response application 1170 has received emergency data. For example, in the example illustrated by FIG. 11, through the low acuity response application 1170, the LAP accessing the low acuity response application 1170 has received emergency data for all five of the incidents 1112 that had been received by the emergency response application 1060 (as illustrated in FIG. 10). In some embodiments, selecting an incident 1112 from the list of incidents 1110 prompts the low acuity response application 1170 to display emergency data associated with the incident 1112 within the GUI of the low acuity response application 1170. For example, in the example illustrated by FIG. 11, incident 1112C has been selected from the list of incidents 1110, and emergency data associated with incident 1112C is now displayed to the right of the list of incidents 1110. In some embodiments, an LAP uses emergency data associated with an incident 1112 and displayed within the low acuity response application 1170 to perform a Secondary Triage (as described above) for a medical emergency associated with the incident 1112.

Figure 12A:
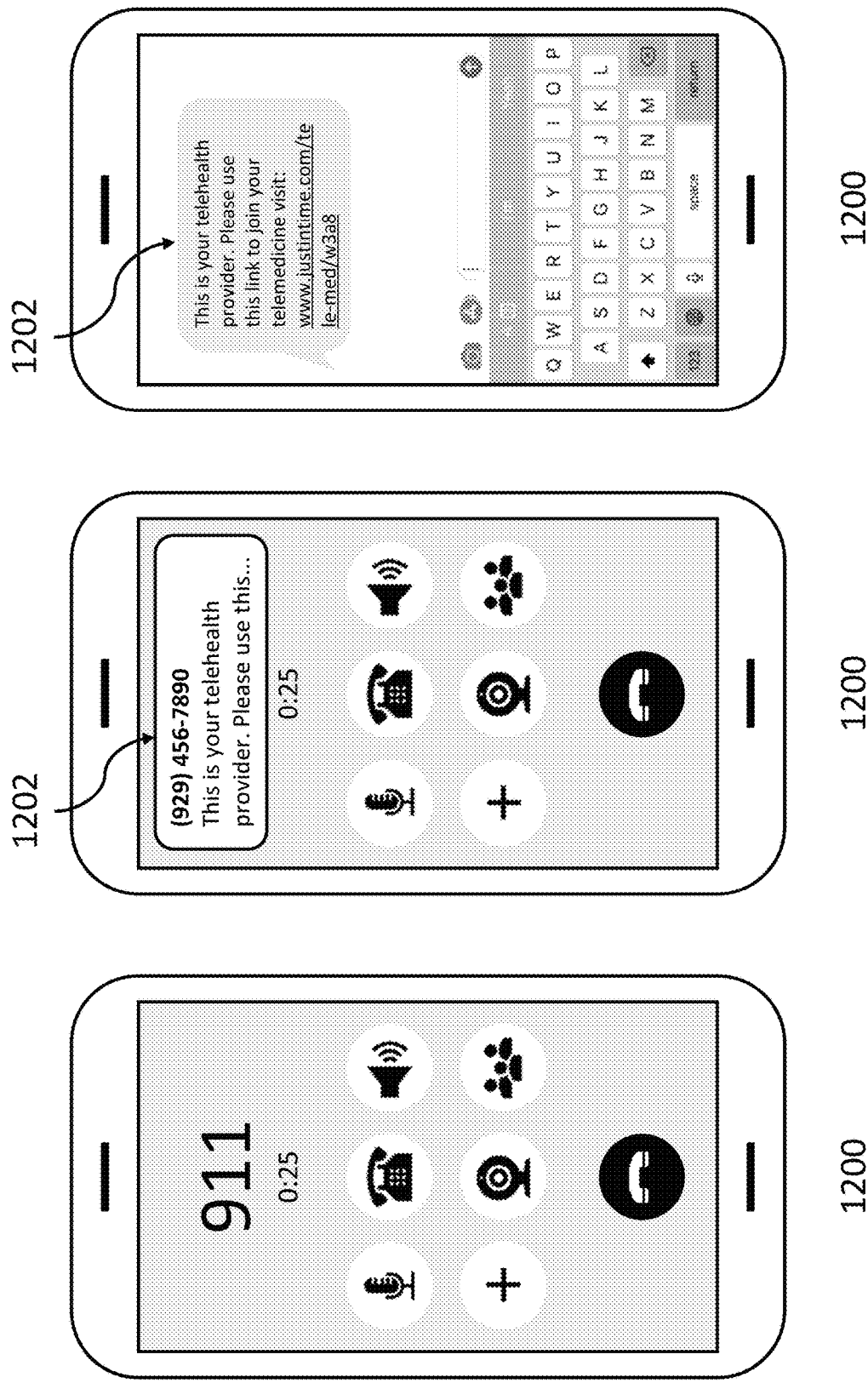
FIG. 12A and FIG. 12B illustrate an example of a mobile communication device in accordance with one embodiment of the present disclosure.
Figure 12B:
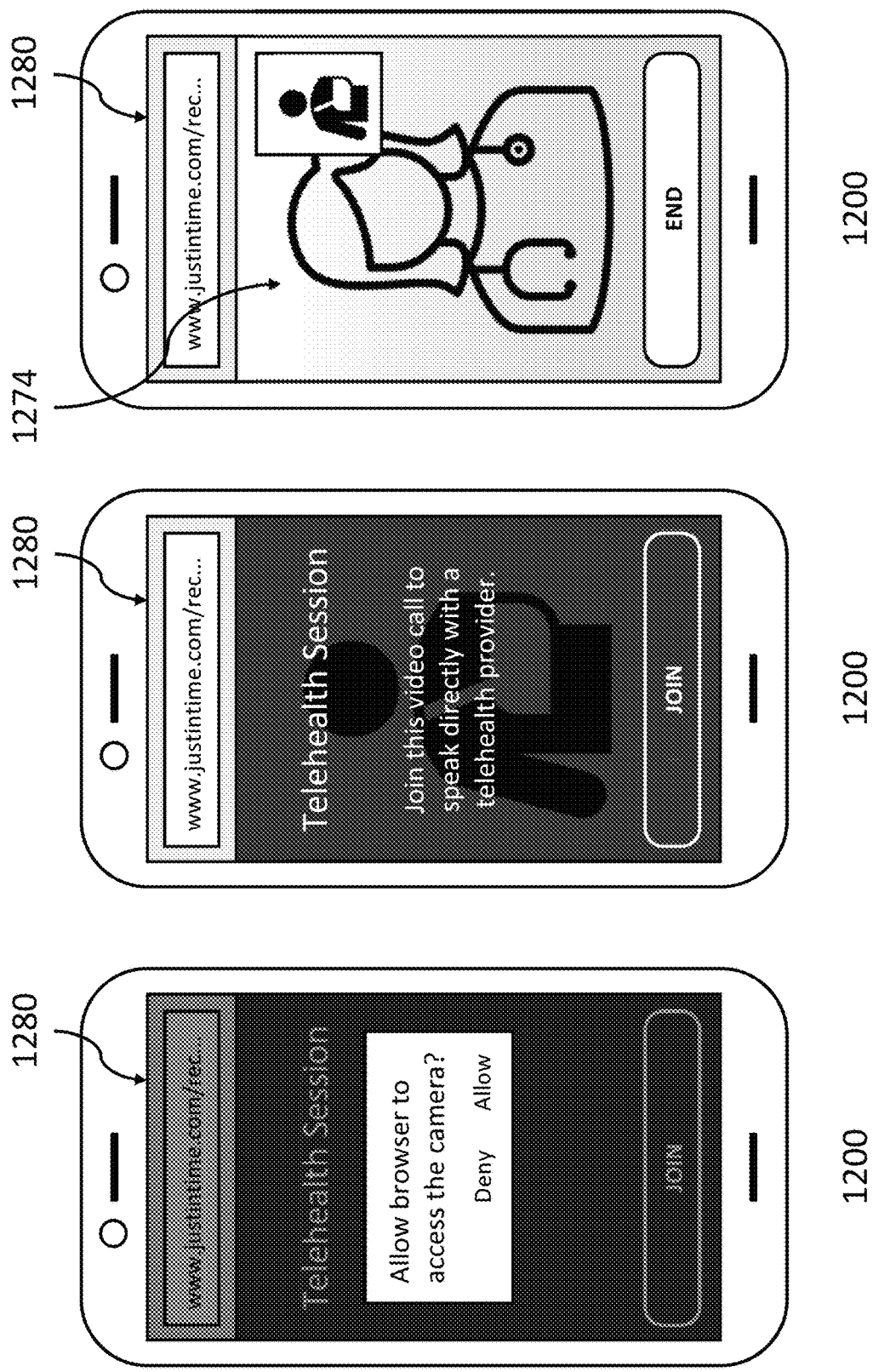

As mentioned above, in some embodiments, when a Secondary Triage (whether performed by an ESP or an LAP, as described above) determines that the most appropriate low acuity response to a medical emergency is a telemedicine visit (e.g., a phone call or video call with a medical professional), the emergency response data platform (ERDP) facilitates a telemedicine visit between an emergency caller and a medical professional through the low acuity response application 1170. For example, in some embodiments, after performing a Secondary Triage and determining that the most appropriate low acuity response for a medical emergency is a telemedicine visit, an LAP can dispatch the low acuity response (e.g., the telemedicine visit) by selecting an incident 1112 associated with the medical emergency within the low acuity response application 1170 and then selecting a Start Call button 1173 to initiate a video call 1174 with the emergency caller. In some embodiments, selecting the Start Call button 1173 prompts the ERDP to transmit a text message (e.g., SMS or MMS) or a push notification 1202 including a weblink to a website hosting a video call 1274 to a communication device 1200 associated with the emergency caller (e.g., the emergency caller's cell phone), as illustrated by FIGS. 12A & 12B. Alternatively or in combination, an application is installed on the communication device (e.g., mobile app installed on a smartphone) that enables enhanced communications such as video calling between the emergency caller and the low acuity provider. In some embodiments, the text message or push notification from the ERDP initiates the application to begin the enhanced communications.

Figure 13:
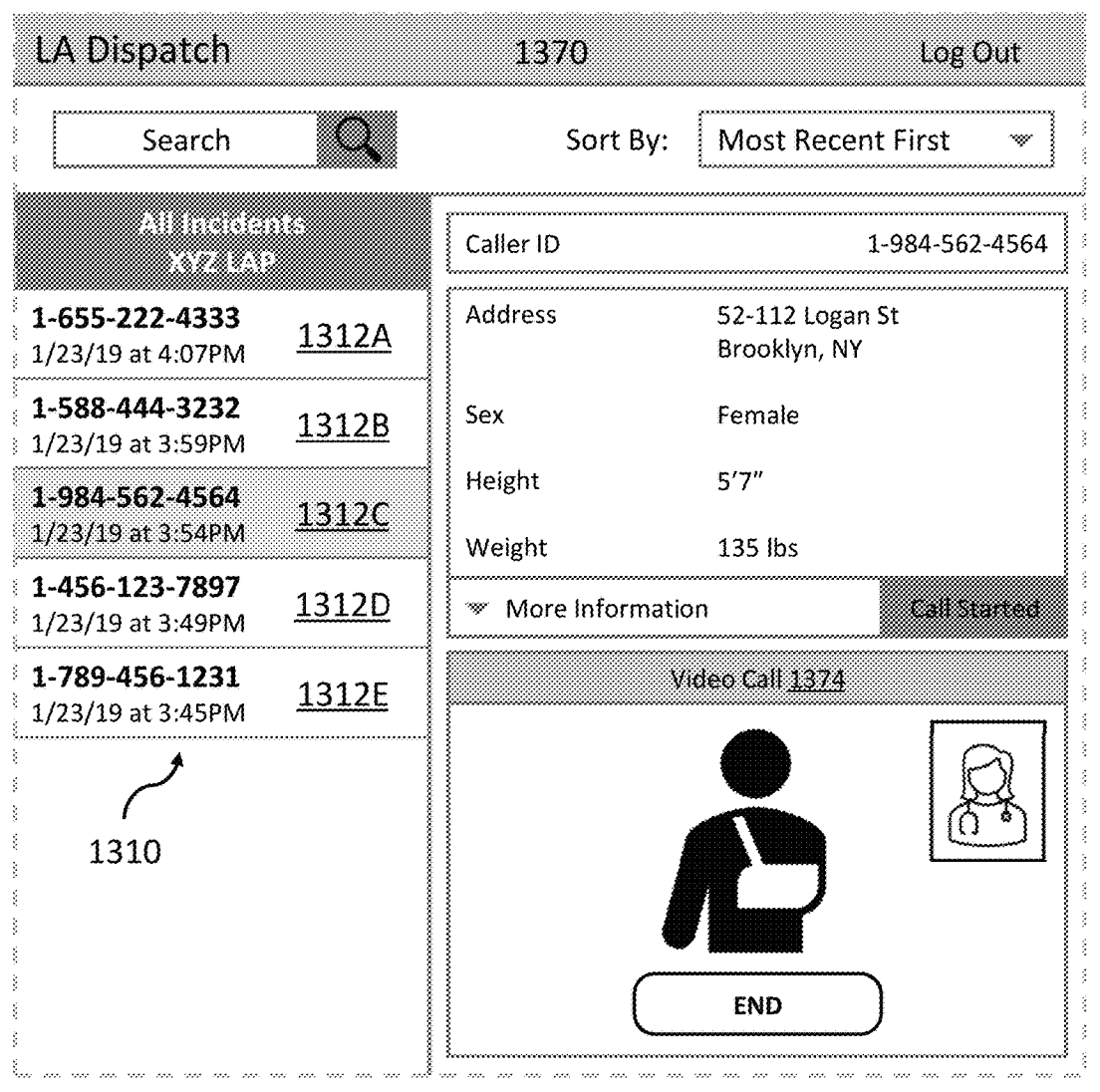

For example, in the example illustrated by FIGS. 12A & 12B, a person experiencing a medical emergency (e.g., an emergency caller) has dialed 9-1-1 and been connected with a public safety answering point (PSAP). A 9-1-1 call taker at the PSAP has performed a Primary Triage (as described above) by speaking with the emergency caller and determining that the emergency caller's medical emergency is a low acuity medical emergency. In this example, the 9-1-1 call taker has additionally performed a Secondary Triage and determined that the most appropriate low acuity response to the emergency caller's low acuity medical emergency is a telemedicine visit. The 9-1-1 call taker then selected a Connect to Telemedicine low acuity triage option provided by an emergency response application provided by the ERDP (e.g., low acuity triage option 1072A, as illustrated by FIG. 10). The ERDP then transmitted emergency data associated with the emergency caller's medical emergency to an LAP through a low acuity response application 1170 provided by the ERDP. The LAP has selected an incident 1112 representing the emergency caller's medical emergency within the GUI of the low acuity response application 1170 and then selected a Start Call button 1173. In response, the ERDP has transmitted a text message 1202 including the weblink www.justintime.com/tele-med/w3a8 to the emergency caller's communication device 1200. The emergency caller opens the text message 1202 and selects the link, which opens a standard web browser on the communication device 1200 and navigates to a website 1280 pointed to by the weblink, which hosts a video call 1274 between the emergency caller and a medical professional associated with the LAP. The video call 1374 is then also shown within the GUI of the low acuity response application 1370 (as illustrated in FIG. 13).

Incident Escalation

Figure 14A:
FIG. 14A and FIG. 14B illustrate an example of a GUI of a low acuity response application in accordance with one embodiment of the present disclosure.
Figure 14B:
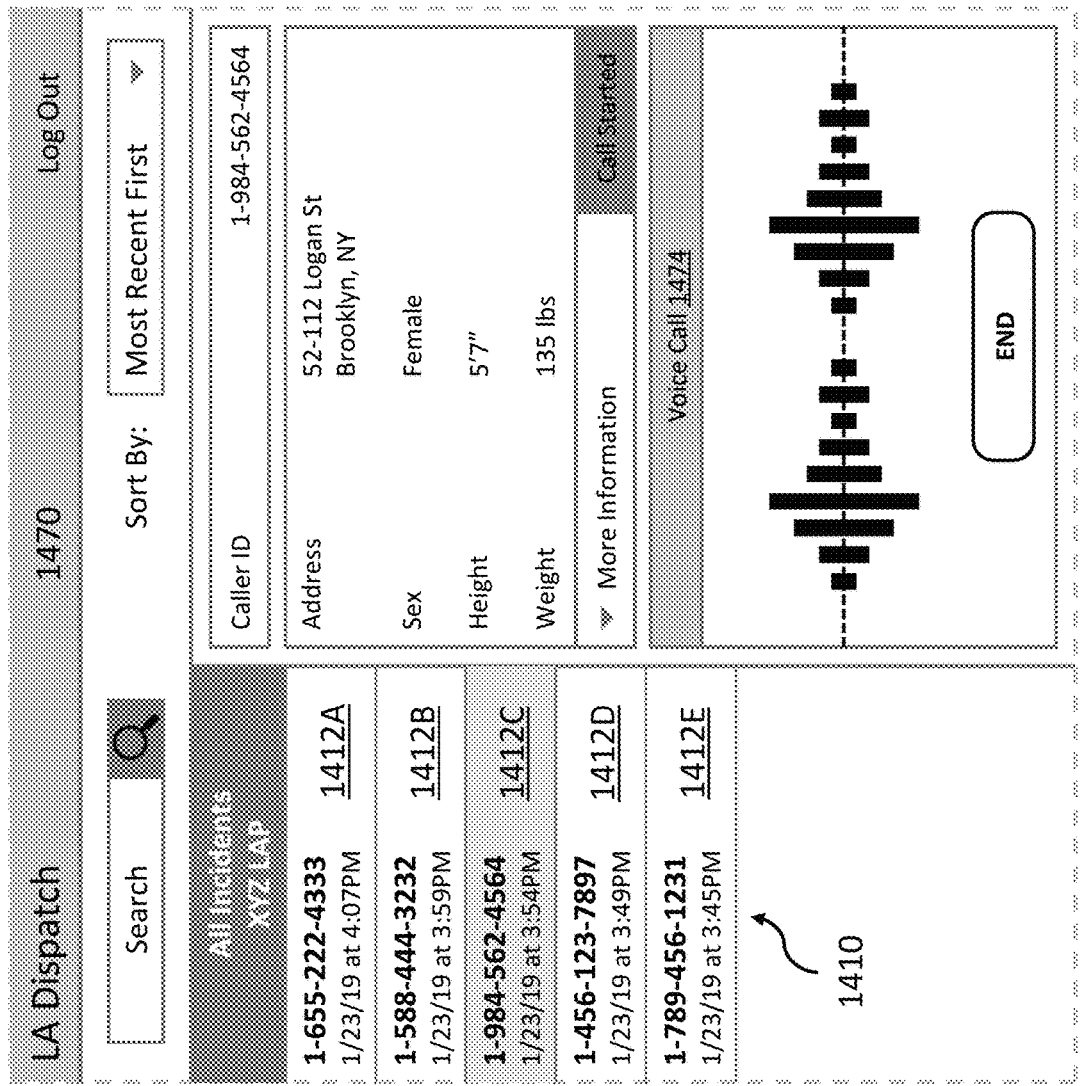

FIGS. 14A and 14B illustrate an example of a low acuity response application, in accordance with one embodiment of the present invention. In various embodiments, as described above, an emergency response data platform (ERDP) facilitates communication between emergency service providers (ESPs) and low acuity providers (LAPs) to allow ESPs to deescalate emergency incidents to LAPs. In some embodiments, however, the ERDP facilitates communication between ESPs and LAPs to allow LAPs to escalate (or re-escalate) emergency incidents to ESPs. For example, in some cases, after performing a Secondary Triage (as described above), or even after dispatching a low acuity response, an LAP may decide to revert triage of a medical emergency to an ESP. For example, an ESP may have erroneously determined that the medical emergency was a low acuity medical emergency, or the medical emergency may have since become a high acuity medical emergency, in which case the triage of the medical emergency should be given back to the ESP for a high acuity response. To this end, in some embodiments, an LAP may generate and transmit a request to escalate the medical emergency (such as by selecting an option within the low acuity response application) to the ERDP. The ERDP can then notify an ESP of the request to escalate the medical emergency (also referred to as an "escalation request"), and the ESP can resume their triage of the medical emergency.

In another example, in some embodiments, an LAP receives an emergency call or an emergency alert directly (e.g., a person experiencing an emergency calls the LAP directly), performs a Primary Triage (as described above), and determines that the emergency call or emergency alert represents an emergency that is high acuity and should be escalated to an ESP for a high acuity response. To do so, the LAP transmits an escalation request to the ERDP, which can then determine an appropriate ESP to respond to the escalation request. Once the ERDP has determined an appropriate ESP to the respond to the escalation request, the ERDP can establish an emergency communication session between the LAP and the ESP and/or transmit emergency data associated with the emergency call or emergency alert to the ESP to assist the ESP in responding to the escalation request. In some embodiments, the escalation request received by the ERDP from the LAP includes an emergency location associated with the emergency call or emergency alert, and the ERDP uses the emergency location to determine the appropriate ESP to respond to the escalation request (e.g., by processing the emergency location through a geofencing system, as described above). In some embodiments, the emergency location is set of coordinates (e.g., a latitude-longitude pair). In some embodiments, the emergency location is a street address. In some embodiments, the escalation request is transmitted to the ERDP in the form of a text message (e.g., SMS or MMS) from an electronic device (e.g., a telephone or a cellular phone) associated with the LAP. In some embodiments, to receive an escalation request from an LAP in the form of a text message, the ERDP provisions a phone number (e.g., an ERDP phone number) for receiving escalation requests, which the ERDP can then provide to the LAP. In some embodiments, the LAP transmits the escalation request to the ERDP through a low acuity response application (as described above) by selecting an escalate button 1473 from within the GUI of the low acuity response application 1470, as illustrated in FIG. 14A.

In some embodiments, in response to receiving the escalation request from the LAP, the ERDP transmits an emergency confirmation request to the LAP, to confirm that the LAP would like to escalate the emergency call or emergency alert to an ESP. In some embodiments, the emergency confirmation request includes the emergency location associated with the emergency call or emergency alert that was received by the ERDP from the LAP. In some embodiments, the emergency confirmation request includes a link to a map showing the emergency location associated with the emergency call or emergency alert that was received by the ERDP from the LAP. In some embodiments, the emergency confirmation request is transmitted to the LAP in the form of a text message (e.g., SMS or MMS). In some embodiments, the emergency confirmation request is transmitted to the LAP through a low acuity response application 1470 (as described above) accessed by the LAP. After receiving the emergency confirmation request, the LAP can confirm or cancel the escalation of the emergency call or emergency alert by responding to the emergency confirmation request. In some embodiments, the LAP responds to the emergency confirmation request in the form of a text message (e.g., SMS or MMS). In some embodiments, the LAP responds to the emergency confirmation request through the low acuity response application 1470. In some embodiments, the ERDP does not transmit an emergency confirmation request to the LAP and proceeds with escalating the emergency call or emergency alert (e.g., by transmitting emergency data associated with the emergency call or emergency alert to an appropriate ESP, or by facilitating an emergency communication session between the LAP and an appropriate ESP) in response to receiving the escalation request. In some embodiments, the ERDP proceeds with escalating the emergency call or emergency alert only in response to receiving confirmation of the escalation from the LAP in a response to the emergency confirmation request.

In some embodiments, to facilitate an emergency communication session 1474 (as illustrated in FIG. 14B) between the LAP and the ESP, the ERDP establishes a communication bridge, establishes a first voice connection (e.g., a phone call, a VoIP call, or otherwise) with the LAP (e.g., an electronic device associated with the LAP), establishes a second voice connection (e.g., a phone call, a VoIP call, or otherwise) with the ESP (e.g., an electronic device associated with the ESP), and bridges the first and second voice connections through the communication bridge. In some embodiments, the first voice connection established with the LAP is established through a low acuity response application 1470 accessed by the LAP. In some embodiments, as described above, the low acuity response application 1470 is provided to the LAP by the ERDP. In some embodiments, the second voice connection established with the ESP is established through an emergency response application accessed by the ESP. In some embodiments, the emergency response application is provided to the ESP by the ERDP, as described above. In some embodiments, the emergency response application is not provided to the ESP by the ERDP. In some embodiments, the emergency response application is a computer aided dispatch (CAD) system. In some embodiments, the emergency response application is a website or a web application accessible via a standard web browser.

For example, in the example illustrated by FIGS. 14A and 14B, a low acuity provider (LAP) has accessed a low acuity response application 1470 (e.g., a low acuity response application that was not provided by the ERDP) that is communicatively coupled to the ERDP. In this example, the low acuity response application 1470 shows that the LAP has received five different emergency calls, represented by emergency incidents 1412A-1412E within the list of emergency incidents 1410. A call taker at the LAP (e.g., a nurse practitioner) is currently responding to emergency incident 1412C, which is shown as selected within the GUI of the low acuity response application 1470. As illustrated in FIG. 14A, because emergency incident 1412C has been selected within the GUI of the low acuity response application 1470, the low acuity response application 1470 now displays any available emergency data associated with the emergency call, such as the emergency caller's phone number, an emergency location associated with the emergency call, and personal information associated with the emergency caller. In performing a Primary Triage (as described above), the call taker at the LAP determines that the emergency caller, who called about a chest pain that they thought was strange but not serious, is potentially experiencing a cardiac emergency and should be taken to an emergency room. However, the LAP is not capable of dispatching ambulances. In this example, the call taker at the LAP decides to escalate the emergency call to an emergency service provider (ESP) that can dispatch an ambulance to the emergency caller by selecting an escalate button 1473 within the GUI of the low acuity response application 1470. In response to receiving the selection of the escalate button 1473, the low acuity response application 1470 transmits an escalation request to the ERDP including the emergency location associated with the emergency call. In this example, in response to receiving the escalation request, the ERDP determines, based on the emergency location associated with the emergency call, an appropriate ESP to respond to the escalation request (e.g., by processing the emergency location through a geofencing system, as described above), transmits emergency data associated with the emergency call to the ESP, and facilitates an emergency communication session 1474 between the LAP and the ESP, as illustrated in FIG. 14B. In this example, to facilitate the emergency communication session between the LAP and the ESP, the ERDP establishes a communication bridge, establishes a first voice call with the LAP, establishes a second voice call with the ESP, and bridges the first and second voice calls on the communication bridge. In this example, the first voice call with the LAP is established with the LAP through the low acuity response application 1470, as illustrated in FIG. 14B. In some embodiments, in response to receiving an escalation request from an LAP, the ERDP establishes a first voice call with the LAP, establishes a second voice call with the emergency caller, establishes a third voice call with an appropriate ESP, and bridges all three voice calls on a communication bridge. In some embodiments, in response to receiving an escalation request from an LAP, the ERDP establishes a first voice call with the emergency caller, establishes a second voice call with an appropriate ESP, and bridges the first and second voice calls on a communication bridge, without the LAP.

In another example, an LAP would like to escalate an emergency call to an ESP but is not communicatively coupled to the ERDP (e.g., the LAP does not have access to a low acuity response application communicatively coupled to the ERDP). In this example, the LAP can transmit an escalation request to the ERDP in the form of a text message (e.g., SMS or MMS) by transmitting a text message from an electronic device (e.g., a cellular phone) associated with the LAP that includes the emergency location associated with the emergency call to a phone number specifically provisioned by the ERDP to receive escalation requests. In this example, in response to receiving the escalation request, the ERDP transmits an emergency confirmation request to the LAP (e.g., the electronic device associated with the LAP) in the form of a text message (e.g., SMS or MMS) as well, and the LAP can confirm or cancel the escalation request by replying accordingly to the emergency confirmation request text message. In response to receiving confirmation from the LAP (e.g., an affirmative response to the emergency confirmation text message), the ERDP proceeds with escalating the emergency call by determining, based on the emergency location included in the escalation request text message, an appropriate ESP to respond to the escalation request and establishing an emergency communication session between the LAP and the ESP by establishing a first voice call with the LAP (e.g., the electronic device associated with the LAP), establishing a second voice call with the ESP, and bridging the first and second voice calls on a communication bridge.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device. In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random-access memory (FRAM). In some embodiments, the non-volatile memory comprises phase-change random access memory (PRAM). In some embodiments, the non-volatile memory comprises magneto resistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing-based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, trackpad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™ PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, a "device" is a digital processing device designed with one or more functionality. A "communication device" refers to a digital processing device with a communication component, which will allow it to send and receive information over a wireless channel, a wired channel, or any combination thereof (e.g., sending/receiving information over the Internet). Examples of communication devices include a mobile phone (e.g., a smartphone), a laptop, a desktop, a tablet, a radio (e.g., a two-way radio), and a vehicular communication system. In some embodiments, a communication device includes a car security system (e.g., OnStar®), a home security system, or a home control system (e.g., a networked control system for providing network controlled and/or smart temperature control such as a Wi-Fi smart thermostat, lighting, entertainment, and/or door control, such as Nest®). In some embodiments, a communication device is an Internet of Things (IoT) device. In some embodiments, the communication device is a sensor for sensing environmental or health indicators. In some embodiments, the sensor may include a sensing component and a communication component. In some embodiments, the triggering device is a sensor in a sensor network or a device that controls a sensor network.

In some embodiments, a communication device is a wearable device (e.g., a communication device worn by a user). In some embodiments, a communication device (e.g., a wearable device) comprises one or more sensors.

As used herein, a "mobile wireless device" refers to a device that is portable and communicates wirelessly. In some embodiments, a user wears or carries the mobile wireless device on the user's person or in the user's vehicle. Examples of mobile wireless devices include mobile or cellular phones, wearable devices (e.g., smart watch, fitness tracker, wearable sensor, smart glasses, etc.).

As used herein, an "associated device" refers to a communication device that is associated with a given communication device. For example, a user may be using several communication devices such as a mobile phone, a wearable, a home security system, a car computer. The user may have registered these devices with his or her account and linked these devices with a user name, user number(s), email address(es), home or other physical address(es). In some embodiments, associated devices may include communication devices of a second user who is associated with user, e.g., a husband and wife, a father and son, a victim and doctor, friends, work colleagues, etc. In some cases, the user may have added the second user as an emergency contact, a member of a group, etc. In some cases, user may have agreed to share location and other data with the second user. In some embodiments, the second user may be someone who is frequently contacted by the user and the communication device identifies the second user from the "Recently called" or "Frequently called" list. In some embodiments, the associated devices may be devices that are proximal or near-by to the communication device such as obtained through a Wi-Fi scan. In some embodiments, an associated device is proximal to the communication device when the location of the associated device is within 1, 5, 10, 15, 20, 25, 30, 35, 40, 45, 50, 60, 70, 80, 90, 100, 200, 300, 400, or 500 meters of the location of the communication device.

As used herein, the "list of associated devices" refers to a list of communication devices that are associated with the user or the given communication device (e.g., a second resident in a smart home). The list of associated devices may be listed by user name, phone number, email address, physical address, coordinates etc. The device entry in the list may include phone number, email address, physical address, coordinates, BSSID, SSID or MAC address. The list may be user defined or generated by the device or the EMS.

As used herein, a "emergency service request" refers to a request or message sent to an emergency service provider for emergency assistance. In some embodiments, a request for assistance is an emergency request for assistance (e.g., the request is associated with an emergency situation) such as, for example, an emergency alert. In some embodiments, an emergency alert comprises a request for assistance. In some embodiments, a request for assistance is associated with an emergency situation. In some embodiments, a request for assistance comprises an emergency indication. In further embodiments, an emergency indication is selected from one or more of the group consisting of traffic accident, police emergency, medical emergency, and fire emergency. In some embodiments, a request for assistance is associated with a non-emergency or low acuity dispatch situation (e.g., request for a tow truck after car breaks down). In some embodiments, a request for assistance is associated with a device sending the request. In other embodiments, a request for assistance is associated with a device not sending the request (e.g., a proxy request on behalf of a second device and/or a member device in a group of devices).

As used herein, a request is "associated" with a device or user when the request relates to an emergency or non-emergency situation involving the device or user. In some embodiments, a request comprises data associated with a device (or user thereof). For example, a request can include current location data. In other embodiments, a request for assistance is sent and/or received separately from data associated with a device. For example, in some embodiments, a request is sent first, and the recipient subsequently queries the device that sent the request for data or a data set associated with the emergency and/or device or user involved in the emergency. Alternatively, in some embodiments, a request is sent first, and the recipient subsequently queries the device associated with the emergency for data or a data set associated with the emergency and/or device or user involved in the emergency.

As used herein, a "emergency responder" refers to any person or persons responsible for addressing an emergency situation. In some embodiments, a first responder refers to government personnel responsible for addressing an emergency situation. In some embodiments, a first responder is responsible for a particular jurisdiction (e.g., a municipality, a township, a county, etc.). In some embodiments, a first responder is assigned to an emergency by an emergency dispatch center. In some embodiments, a first responder responds to a request for emergency assistance placed by a user via a user communication device. In some embodiments, a first responder includes one or more fire fighters, police officers, emergency medical personnel, community volunteers, private security, security personnel at a university, or other persons employed to protect and serve the public and/or certain subsets of the population.

As used herein, an "emergency service provider" (ESP) is a public or private organization or institution responsible for providing emergency services. For example, in some embodiments, an EDC (e.g., a public safety answering point (PSAP)), a fire department, a police department, and a hospital may all be considered emergency service providers. In some embodiments, an emergency responder is a member of an ESP. In some embodiments, an ESP personnel is a person who works at an ESP. For example, an ESP personnel may be a call-taker at a PSAP or a first responder at a fire department.

As used herein, a "recipient" refers to one or more persons, services, or systems that receive a request for assistance (e.g., an emergency alert). The recipient varies depending on the type of request. In some embodiments, a recipient is an emergency service. In some embodiments, a recipient is an emergency service when he requests for assistance pertains to an emergency (e.g., a tier 2 emergency). In some embodiments, a recipient is an emergency management system. In some embodiments, a recipient is an emergency dispatch center. In some embodiments, a recipient is an emergency dispatch center, wherein the request is first routed through an emergency management system (e.g., request is sent to the EMS, but ultimately is sent to an EDC). In some embodiments, a recipient is a first responder (e.g., a communication device of a first responder). In some embodiments, a recipient is a non-emergency service or personnel, for example, a relative or friend. In such situations, a user of a communication device (or member device or second device) does not require emergency assistance, but does need help.

As used herein, an "emergency data source" refers to any device, server, or system that can produce, generate, or communicate information or data pertinent to an emergency. In some embodiments, an emergency data source is a communication device, a wearable device, an internet of things (IoT) device, or any other type of device. In some embodiments, an emergency data source is a network server. As used herein, an "emergency data recipient" refers to any device, server, or system or user of any device, server, or system that can receive information or data pertinent to an emergency. In some embodiments, an emergency data recipient is an emergency service provider (ESP), ESP personnel, or an electronic device associated with an ESP. In some embodiments, an emergency data recipient is a person in an emergency or an electronic device associated with a person in an emergency.

As used herein, a "user" refers to one or more person or persons associated with a device (e.g., communication device, member device, second device, device of a first responder, etc.). In some embodiments, a user utilizes a device to place a request for assistance. In some embodiments, user refers to one or more persons who are paid subscribers of a network access service, for example, cellular service subscribers. In some embodiments, a user refers to anyone who gains access to a network via a router, for example, a Wi-Fi router, and is not a paid subscriber of any access service. In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc.).

As used herein, "data" refers to a collection of information about one or more entities (e.g., user of a user communication device) and/or an environment that pertains to characteristics of the one or more entities. In some embodiments, an entity is a person. In some embodiments, an entity is a thing (e.g., a house). For example, in some embodiments, data comprises sensor data from home sensors associated with a house. In this example, the data is also associated with one or more persons (e.g., the homeowner(s) and/or inhabitant(s)). In some embodiments, data refers to meta-data. In some embodiments, data comprises health information about the user of a communication device. In some embodiments, data comprises information about the surrounding environment of the user of the user communication device (e.g., surrounding temperature, location, elevation, barometric pressure, ambient noise level, ambient light level, surrounding geography, etc.). In some embodiments, data comprises information about other users that is pre-stored in a device or in a database (e.g., a database within a group of devices who are related to the user of the user communication device as predefined by the user). In some embodiments, the data set comprises information from two or more users of user communication devices, wherein each user is affected by the current emergency situation. As an example, two unrelated users are involved in a vehicular collision, and each user sends a separate emergency request (for traffic accident) using his/her communication device. In this example, the separate emergency requests are associated (e.g., by an emergency management system and/or emergency dispatch center) with the same emergency based on the proximity of time, location, and emergency indication of the emergency requests. As a result, the data set for this accident comprises information from both user communication devices. In this example, the data set comprises location information from both devices (e.g., GPS coordinates), biosensor data for one or both devices (e.g., biosensor data such as heart rate and blood pressure can be important in case of injury), and information about the vehicle driven by each user (e.g., make, model, and year of manufacture information stored on the device). In some embodiments, data comprises current data. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g., when a sensor first detects a sensed parameter such as, for example, heart rate).

As used herein, "health data" refers to medical information associated with a user of a device. In some embodiments, health data comprises medical history such as, for example, past illnesses, surgery, food and/or drug allergies, diseases, disorders, medical diagnostic information (e.g., genetic profile screen), or any combination thereof. In some embodiments, health data comprises family medical history (e.g., family history of breast cancer). In some embodiments, health data comprises current health information such as, for example, current symptoms, current medications, and/or current illnesses or diseases. In some embodiments, health data comprises user age, height, weight, blood type, and/or other biometrics.

As used herein, "user data" refers to general information associated with a user of a device. In some embodiments, user data comprises user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof. In some embodiments, user data is obtained via user input.

As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component).

As used herein, "communication link" refers to a communication pathway from a device (e.g., communication device) to another device or to an intermediate device (e.g., a router) on a network. In some embodiments, the communication device establishes a communication link with another device or an intermediate device to transfer information (e.g., a location of the device) or to obtain information from a recipient such as, for example, location of a first responder assigned to a request for assistance associated with the communication device (e.g., device of first responder). A communication link refers to the point-to-point communication channels, point-to-point and end-to-end data sessions, and the physical hardware facilitating the communication channel(s) (e.g., antennas used to communicate/transmit information). In some embodiments, a data session comprises session parameters and the network route taken from one device to another device.

As used herein, a "data channel" refers to a communication session between two devices wherein data packets are exchanged between the devices. In some embodiments, a data session is setup using exchange of certain data packets, also called as "handshake signals," which are able to define the capabilities of the data session. For example, in some embodiments, the data session "handshake" provides for the ability to transfer multi-media data, voice data, and other data via the data session. In some embodiments, the data session is setup without the use of handshake signals, wherein the two devices involved share data packets according to a predefined protocol (e.g., a previously agreed upon protocol). In some embodiments, the data session is routed through an EMS, which stores the multi-media, voice, and/or other data from any of the devices that are part of the data session. In further embodiments, the EMS shares the data from the data session with the other device (e.g., device of a first responder). In some embodiments, the EMS manages the data session.

Modern communication devices, for example, smart phones, tablet computers, wearable communication devices, smart sensor devices and/or systems are often equipped with a variety of features for determining location information of the communication device using, for example, GPS, or triangulation with cellular phone towers. Modern communication devices also often include functionality to store data regarding a user of the communication device, for example, health information about the user.

In some embodiments, the communication device (or communication module of the device) communicates with a recipient through one or more data channels. In some embodiments, the recipient is an emergency management system. In some embodiments, the EMS routes communications to an EDC. In further embodiments, the EMS establishes a first data channel with the communication device and a second data channel between the EMS and the EDC, wherein the EMS bridges the first and second data channels to enable the communication device and the EDC to communicate. In some embodiments, the EMS converts data (e.g., data set) from the communication device into a format suitable for the EDC (e.g., analog or digital, audio, SMS, data, etc.) before sending or routing the formatted data to the EDC. In some embodiments, the EMS routes communications to a device associated with a first responder. In some embodiments, the communication device relays additional communications, information, and/or data sent or shared between member devices in the group of devices to the EMS or EDC after a request for assistance has been sent. In further embodiments, the additional information is relayed to the EMS or EDC after the request for assistance has been sent in order to provide current information that is relevant to the request. For example, in some instances, communications between member devices contain information relevant to the emergency (e.g., information that the user of member device who is experiencing a medical emergency suffers from diabetes). Accordingly, in some embodiments, the information is sent autonomously, at request of a user of the communication device, or at request of the recipient (e.g., EMS, EDC, first responder, etc.).

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

EXAMPLES

The following illustrative examples are representative of embodiments of the invention described herein and are not meant to be limiting in any way.

Just In Time, an emergency response company, aids emergency service providers (ESPs; e.g., public safety answering points, or "PSAPs") by providing a central hub for connected devices and systems (e.g., mobile phones, IoT devices, etc.) to communicate with ESPs. Through this central hub, connected devices and systems may transmit data and electronic communications to ESPs and ESPs may transmit data and electronic communications to connected devices and systems. Traditionally, PSAPs and other ESPs are only technologically capable of receiving telephone calls (e.g., 9-1-1 emergency calls) with no additional data. Thus, typically, when a person is in an emergency, they must make an emergency call (e.g., by dialing 9-1-1 in the United States) and verbally communicate the details of their emergency to a call taker at an ESP. The central hub provided by Just In Time (also referred to as an "emergency response data platform" or "ERDP") provides ESPs with new and additional ways to respond to emergencies.

One of the new and additional ways to respond to emergencies that Just In Time's Emergency Response Data Platform provides to ESPs is the ability to communicate with and leverage low acuity emergency service providers (also referred to as "low acuity providers" or "LAPs") when an ESP determines that an emergency that the ESP is responding to is a "low acuity" emergency (e.g., the emergency does not require the traditional dispatch of an ambulance or a police unit). For example, LAPs may include medical clinics, social workers, telemedicine providers, and crisis management teams. Traditionally, LAPs have limited or no ability to communicate with ESPs during emergencies. As a result, in many instances, ESPs have been forced to dispatch ambulances and police units to medical and personal emergencies, respectively, when a low acuity response from an LAP would have been preferable. By providing a system whereby ESPs and LAPs can communicate with one another, Just In Time gives ESPs the ability to dispatch LAPs to emergencies when appropriate, thereby providing more appropriate emergency care and saving expensive and limited emergency resources.

Example 1

A PSAP in Baltimore, Maryland employs an emergency response application, Nick Of Time, communicatively coupled to Just In Time's backend systems. Just In Time has also integrated a plurality of LAPs with Just In Time's backend systems, including a nurse triage line, a telemedicine provider, and a medical clinic. Through Nick Of Time, the PSAP is able to access the LAPs integrated with Just In Time's backend systems when appropriate.

In one instance, a call taker at the PSAP receives an emergency call from a person that has developed a strange rash on their arm. In this instance, the call taker steps through a priority dispatch protocol developed by the PSAP and asks the emergency caller a series of questions, accordingly. After receiving answers to the series of questions outlined by the priority dispatch protocol from the emergency caller, the call taker determines that, while the rash is concerning, the emergency caller is likely not in immediate danger or facing an immediate life-threatening risk. In other words, the call taker has determined that the emergency caller's emergency is likely a non-emergent, low acuity medical emergency.

After determining that the emergency caller's emergency is likely a non-emergent, low acuity medical emergency, the call taker selects an incident representing the emergency caller's emergency within the graphical user interface (GUI) of the Nick Of Time emergency response application and then selects a low acuity response button. In response, the Nick Of Time application displays options for connecting with the nurse triage line, the telemedicine provider, and the medical clinic. In this instance, the call taker selects the option to connect with the nurse triage line, which prompts the Just In Time backend system to initiate a Voice over Internet Protocol (VoIP) phone call between the nurse triage line and call taker at the PSAP. In parallel, the Just In Time backend system transmits any available emergency data pertaining to the emergency caller's call or emergency to a computing system associated with the nurse triage line. The call taker at the PSAP briefly describes the emergency caller's emergency a nurse over the nurse triage line before transferring the emergency call over to the nurse triage line as well. From there, using the emergency data received from the Just In Time backend system and speaking directly with the emergency caller, the nurse on the nurse triage line administers a low acuity emergency response to the emergency caller by instructing the emergency caller to take Benadryl and to visit a medical clinic if the rash continues to grow.

Example 2

In another instance, the call taker at the Baltimore PSAP previously referred to in Example 1 receives an emergency call from a person who is experiencing severe nausea. In this instance, the call taker at the PSAP again steps through the priority dispatch protocol by asking the emergency caller a series of questions to better understand the emergency caller's emergency. After receiving answers to the series of questions outlined by the priority dispatch protocol from the emergency caller, the call taker again determines that the emergency caller's emergency is likely a low acuity medical emergency.

After determining that the emergency caller's emergency is likely a low acuity medical emergency, the call taker again selects an incident representing the emergency caller's emergency within the GUI of the Nick Of Time emergency response application and selects the low acuity response button. In response, the Nick Of Time application again displays the options for connecting with the nurse triage line, the telemedicine provider, and the medical clinic. In this instance, however, the call taker determines that the best course of action is to connect the emergency caller with a telemedicine provider right away, as opposed to forwarding the emergency caller to the nurse triage line. Accordingly, the call taker selects the option to connect to the telemedicine provider, which prompts the Just In Time backend systems to transmit emergency data pertaining to the emergency caller's emergency to the telemedicine provider and a request to initiate a telemedicine low acuity response.

In this instance, the telemedicine provider receives the emergency data pertaining to the emergency caller's emergency and the request to initiate a telemedicine low acuity response through a low acuity response application, Always On Time, also provided by Just In Time, accessed on a computing device associated with the telemedicine provider. Seeing the request to initiate a telemedicine low acuity response for the emergency caller's emergency within the GUI of Always On Time, the telemedicine provider can select a start call button to initiate a telemedicine session with the emergency caller. In this instance, in response to the telemedicine provider selecting the start call button, the Just In Time backend system transmits a text message to the emergency caller's phone number including a link to a video call hosted between the telemedicine provider through the Always On Time GUI and the emergency caller's smartphone. When the video call is successfully established between the telemedicine provider and the emergency caller, a notification is transmitted to the call taker through the Nick Of Time GUI, at which point the call taker ends the emergency call. In this instance, after administering the telemedicine session with the emergency caller, the telemedicine provider (e.g., a doctor) determines that the emergency caller may be experiencing appendicitis, which is a potentially life-threatening condition. Accordingly, the telemedicine provider selects an option with the Always On Time GUI to revert the emergency caller to the PSAP, which prompts the Just In Time backend system to transmit a notification to the call taker through the Nick Of Time GUI. Seeing the notification, the call taker calls the emergency caller back while initiating the process of dispatching an ambulance to the emergency caller.

What is claimed is:

1. A method for providing assistance to an emergency service provider by an emergency response data platform (ERDP), the method comprising:
   (a) establishing a communication link with an emergency service provider (ESP) through an emergency response application executed on a computing device associated with the ESP, wherein the emergency response application comprises a first graphical user interface (GUI) comprising a list of one or more emergency incidents;
   (b) receiving, through the emergency response application, a secondary triage notification indicating that the ESP would like to initiate a low acuity response to an emergency incident selected from the list of one or more emergency incidents, wherein the secondary triage notification comprises an initial determination that the emergency incident represents a low acuity emergency that is non-emergent and does not require dispatching an ambulance or police unit; and
   (c) responsive to receiving the secondary triage notification, transmitting emergency data associated with the emergency incident to a low acuity provider (LAP) for display within a second graphical user interface (GUI) of a low acuity response application accessed by a computing device associated with the LAP, wherein the low acuity response application displays an option for requesting escalation of the emergency incident back to the ESP.

2. The method of claim 1, further comprising, in response to receiving the secondary triage notification, removing the emergency incident from the list of one or more emergency incidents.

3. The method of claim 2, further comprising receiving, through the low acuity response application, a request to escalate the emergency incident.

4. The method of claim 3, further comprising, in response to receiving the request to escalate the emergency incident, replacing the removed emergency incident within the list of one or more emergency incidents or generating a new emergency incident within the list of one or more emergency incidents to replace the removed emergency incident.

5. The method of claim 1, wherein the selection of the emergency incident from the list of one or more emergency incidents prompts the emergency response application to display a plurality of low acuity triage options within the first GUI of the emergency response application and wherein the request to initiate a low acuity response to the emergency incident is generated by the emergency response application in response to a selection of one of the plurality of low acuity triage options.

6. The method of claim 5, wherein the plurality of low acuity triage options is associated with a respective plurality of LAPs.

7. The method of claim 5, wherein the plurality of low acuity triage options comprises two or more of nurse triage response, telemedicine response, crisis management response, and self-transport response.

8. The method of claim 1, wherein the emergency response application is not provided to the ESP by the ERDP.

9. The method of claim 8, wherein the emergency response application is a customer premises equipment (CPE), call handling equipment (CHE), or computer aided dispatch (CAD) system.

10. The method of claim 1, wherein the low acuity response application is not provided to the LAP by the ERDP.

11. The method of claim 1, wherein the low acuity response application is a website or a web application accessible via a standard web browser and provided to the LAP by the ERDP.

12. The method of claim 1, further comprising facilitating an emergency communication session between the LAP and a communication device associated with the emergency incident.

13. The method of claim 12, wherein the emergency communication session between the LAP and the communication device associated with the emergency incident is facilitated through the low acuity response application.

14. The method of claim 12, wherein the LAP is a telemedicine provider.

15. The method of claim 12, wherein the emergency communication session is an audio or voice call.

16. The method of claim 15, wherein facilitating the emergency communication session between the LAP and the communication device associated with the emergency incident comprises transmitting a weblink to the communication device associated with the emergency incident and wherein the weblink points to the audio or video call.

17. The method of claim 12, wherein facilitating the emergency communication session between the LAP and the communication device associated with the emergency incident comprises:
   (a) establishing a communication bridge for the emergency communication session;
   (b) connecting a voice call between the communication bridge associated with the emergency incident and the ESP to the communication bridge; and
   (c) connecting the LAP to the communication bridge.

18. A system for providing assistance to an emergency service provider (ESP), the system comprising a network component operatively in communication with a plurality of emergency service providers (ESPs) and a plurality of low acuity providers (LAPs) and a processor, operatively coupled to the network component, the processor configured to:
   (a) establish a communication link with an emergency service provider (ESP) through an emergency response application executed on a computing device associated with the ESP, wherein the emergency response application comprises a first graphical user interface (GUI) comprising a list of one or more emergency incidents;
   (b) receive, through the emergency response application, a secondary triage notification indicating that the ESP would like to initiate a low acuity response to an emergency incident selected from the list of one or more emergency incidents, wherein the secondary triage notification comprises an initial determination that the emergency incident represents a low acuity emergency that is non-emergent and does not require dispatching an ambulance or police unit; and
   (c) responsive to receiving the secondary triage notification, transmit emergency data associated with the emergency incident to a low acuity provider (LAP) for display within a second graphical user interface (GUI) of a low acuity response application accessed by a computing device associated with the LAP, wherein the low acuity response application displays an option for requesting escalation of the emergency incident back to the ESP.

19. A system for providing assistance to an emergency service provider, the system comprising:
(a) an emergency service provider (ESP), communicatively coupled to an emergency response data platform (ERDP), configured to:
  (i) execute, on a computing device associated with the ESP, an emergency response application comprising a first graphical user interface (GUI) comprising a list of one or more emergency incidents; and
  (ii) transmit, through the emergency response application, a secondary triage notification indicating that the ESP requests to initiate a low acuity response to an emergency incident selected from the list of one or more emergency incidents, wherein the request to initiate a low acuity response comprises an initial determination that the emergency incident represents a low acuity emergency that is non-emergent and does not require dispatching an ambulance or police unit;
(b) the ERDP, configured to:
  (i) receive, from the ESP, the secondary triage notification; and
  (ii) responsive to receiving the secondary triage notification, transmit emergency data associated with the emergency incident to a low acuity provider (LAP); and
(c) the LAP, configured to:
  (i) execute a low acuity response application on a computing device associated with the LAP; and
  (ii) receive, from the ERDP, the emergency data associated with the emergency incident for display within a second graphical user interface (GUI) of the low acuity response application, wherein the low acuity response application displays an option for requesting escalation of the emergency incident back to the ESP.

* * * * *